(12) United States Patent
Fujii et al.

(10) Patent No.: US 7,246,979 B2
(45) Date of Patent: Jul. 24, 2007

(54) MULTI-PITCH SCREW, MULTI-PITCH NUT, FEED SCREW DEVICE USING THE SCREW AND NUT, AND METHOD OF PRODUCING THE NUT

(75) Inventors: Hiroshi Fujii, Aichi (JP); Katsuhiro Sugiyama, Motosu (JP); Masashi Mitsukuchi, Konan (JP); Kenichi Katayama, Ogaki (JP); Yoshinori Moriguchi, Kakamigahara (JP)

(73) Assignees: Kabushiki Kaisha Imasen Denki Seisakusho, Inuyama-shi, Aichi (JP); Nagoya Industrial Science Research Institute, Nagoya-shi, Aichi (JP)

( * ) Notice: Subject to any disclaimer, the term of this patent is extended or adjusted under 35 U.S.C. 154(b) by 3 days.

(21) Appl. No.: 10/508,773

(22) PCT Filed: Oct. 22, 2003

(86) PCT No.: PCT/JP03/13508

§ 371 (c)(1),
(2), (4) Date: Sep. 22, 2004

(87) PCT Pub. No.: WO2004/051098

PCT Pub. Date: Jun. 17, 2004

(65) Prior Publication Data

US 2005/0141983 A1 Jun. 30, 2005

(30) Foreign Application Priority Data

Nov. 29, 2002 (JP) ............................. 2002-346891

(51) Int. Cl.
*F16B 39/30* (2006.01)
*F16B 19/00* (2006.01)
*F16B 35/04* (2006.01)

(52) U.S. Cl. ....................... 411/310; 411/308; 411/309; 411/366.1; 411/411
(58) Field of Classification Search ........ 411/308–310, 411/366.1, 411
See application file for complete search history.

(56) References Cited

U.S. PATENT DOCUMENTS

| | | | | |
|---|---|---|---|---|
| 113,557 | A * | 4/1871 | Pearson | 411/272 |
| 3,176,746 | A * | 4/1965 | Walton | 411/259 |
| 3,972,359 | A * | 8/1976 | Thomas | 411/308 |
| 3,972,360 | A * | 8/1976 | Cadwallader | 411/310 |
| 3,972,361 | A * | 8/1976 | Ollis, Jr. | 411/277 |
| 3,982,575 | A * | 9/1976 | Ollis et al. | 411/310 |
| 4,273,175 | A * | 6/1981 | Capuano | 411/168 |

(Continued)

FOREIGN PATENT DOCUMENTS

JP 4745973 11/1972

(Continued)

*Primary Examiner*—Robert J. Sandy
*Assistant Examiner*—David Reese
(74) *Attorney, Agent, or Firm*—Lucas & Mercanti, LLP

(57) ABSTRACT

A flat portion 12a and a slope portion 12b are provided on a thread 12 of a multi-pitch screw 10 alternately. The flat portion and the slope portion are provided on the thread of a multi-pitch nut which fastens with this. Consequently, a screw and a nut capable of preventing loosening securely by step are achieved. This enables comfortable and quick feeding and when a torque from a driving source is interrupted, step-like self-lock is activated.

7 Claims, 19 Drawing Sheets

U.S. PATENT DOCUMENTS 6,974,289 B2 * 12/2005 Levey et al. ................ 411/310

FOREIGN PATENT DOCUMENTS

| JP | 5992253 U | 6/1984 |
| JP | 6048931 U | 4/1985 |
| JP | 6274475 U | 5/1987 |
| JP | 63-152762 | 6/1988 |
| JP | 63152762 | 6/1988 |
| JP | 3039156 U | 4/1997 |

\* cited by examiner

Fig.5
(A)
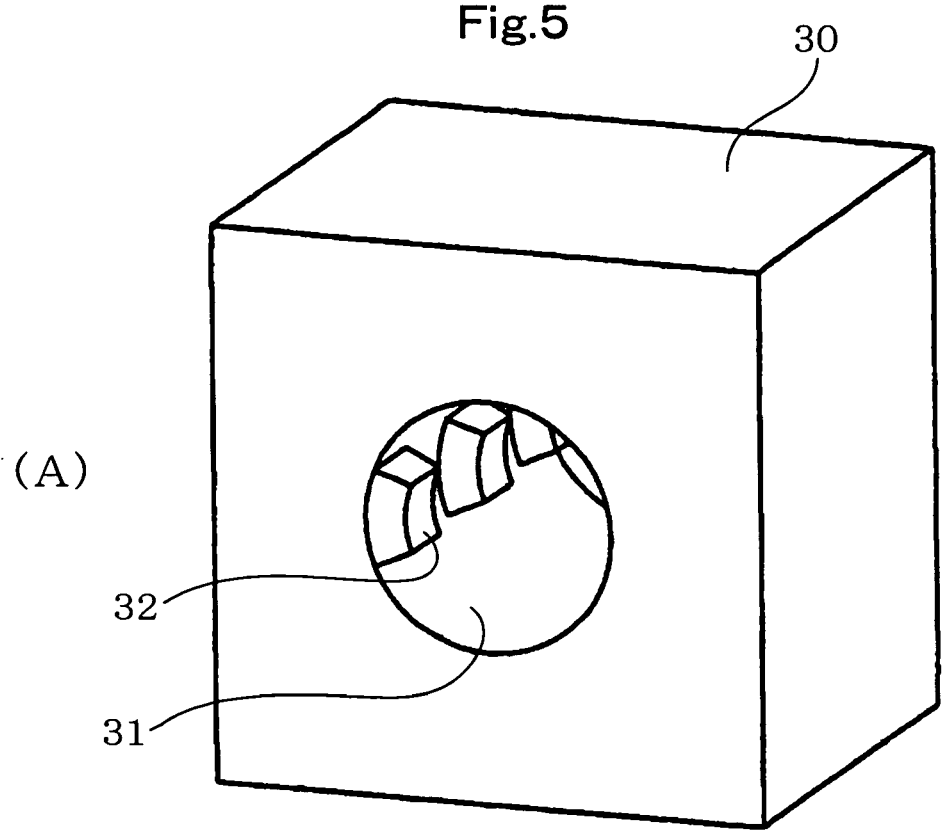
(B)
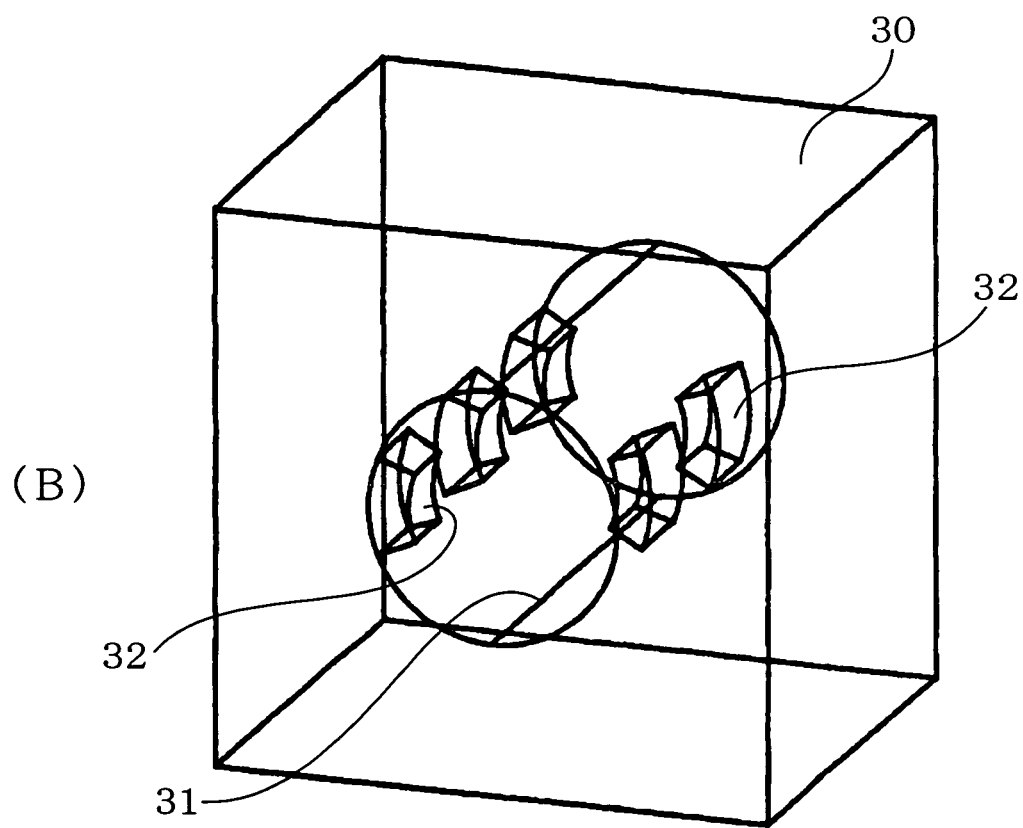

Inclined part

Step part

US 7,246,979 B2

MULTI-PITCH SCREW, MULTI-PITCH NUT, FEED SCREW DEVICE USING THE SCREW AND NUT, AND METHOD OF PRODUCING THE NUT

This application is a 371 of PCT/JP03/13508 filed Oct. 22, 2003.

TECHNICAL FIELD

The present invention relates to a screw and a nut and more particularly to a screw and a nut for tightening members, having a function of blocking looseness as a first aspect thereof and as a second aspect, a feed screw mechanism for converting a rotary motion to a linear motion having a self-lock function.

BACKGROUND ART

The screw and nut are basic elements and various kinds of proposals have been presented for them conventionally. The first aspect is regarding screw looseness stoppage. For example, Japanese Utility Model No. SHO58-99513 has proposed a screw in which any one of its female and male threads is formed into a wave-shape. Because when the screw is driven, its wave-shaped protruded portion is deformed elastically so that it presses hard axially, it prevents the screw from being loosened due to a vibration or the like. Further, JP 6-330928 A has proposed a screw in which its threads are constructed with a large pitch and a small pitch alternately for every pitch. When this is fastened with a standard pitch nut, a portion which is pressed strongly by the flank of a thread and deformed is generated thereby preventing the screw from being loosened.

Mr. Hiroshi Fujii, who is one of the inventors of this invention, publicized a step lock bolt as shown in FIG. 19. The flank of a thread of a bolt is provided with fine step portion and slope portion in order to prevent the bolt looseness with plastic deformation of the thread and mating member which occurs with driving of the bolt. These proposals are described in non-patent documents 1 to 3.

Non-patent document 1: Journal of Materials Processing Technology Vol. 56, p 321-332, "Evaluation of Anti-loosening Nuts for Screw Fasteners" H, Fujii et al. 1996

Non-patent document 2: Bulletin of the Japan Society of Mechanical Engineers, series C, volume 62 (597), p 1963-1968, "Development of Screw Fastener Extremely Difficult to Loosen" H, Fujii et al, 1996

Non-patent document 3: Bulletin of the Japan Society of Mechanical Engineers, series C, volume 62 (596), p 1527-1532, "Analysis of Loosening Mechanism of Screw Fastener and Development of Loosening Test Method", H, Fujii et al, 1996

The second aspect concerns the feed screw mechanism. For example, Japanese Utility Model registered No. 2577786 has disclosed an automobile power seat in which the screw is rotated with a worm decelerator provided motor so as to feed a nut member. The lock when the motor is not driven is achieved by self-lock of the feed screw itself or self-lock of the worm decelerator. Further, JP 5-288253 A has described conventional feed screw mechanisms under three categories easily understandably. A first group converts a rotary motion to a liner motion by sliding rotation between a triangular thread, trapezoidal screw thread or the like and their nut. A second group transmits a drive power through plural steel balls provided in a thread groove like a ball screw. In a third group, with a roller pressed against both flanks of a thread of a screw shaft having a large lead, a member which supports that roller is used like a nut.

However, the above-described conventional screw and nut are premised on that a relative rotation between the both is continuous. A first premise is that as for blocking of looseness between the screw and nut for fastening a certain member, that screw is capable of fastening the member even when its relative rotational position is at any position of 360°, corresponding to a single full turn and further blocking it from being loosened. Although this is preferable from viewpoints of the function, an excessive load is applied to a structure for blocking the looseness. For the reason, the deforming portion of the thread when the screw is tightened does not end with elastic deformation but reaches a plastic deformation depending on the case. This means that if the screw is tightened completely, it cannot be retightened for blocking the looseness. Here, if the way of thinking is turned over, there can be an application field of the screw and nut in which even if the screw cannot be tightened additionally for blocking the looseness when its relative rotational position is located at any position of continuous rotation, its sufficient function is achieved if it can be retightened at a step-like rotation position of every 20° for blocking the looseness, depending on a tightening member or a lead of the screw.

Accordingly, a first object of the present invention is to provide a screw and nut which can be locked only discontinuously but is capable of blocking the looseness securely without applying an excessive stress on a member.

As for the second aspect, the feed screw mechanism, when converting rotary motion to linear motion, the conventional device requests for its continuity and linearity implicitly. The conventional invention intends to search for a higher accuracy or a higher speed on this premise. If converting the way of thinking, the continuity or linearity is not requested depending on application of the feed screw mechanism. For example, in the vehicle power seat, adjustment in a pitch of less than 1 mm is not requested for adjustment of the seat position and seat height. Further, linearity of linear motion to a rotary angle of the drive motor is not requested so much. However, because the employed feed screw mechanism is provided with continuity and linearity, excessive functions are requested for the feed screw mechanism.

For example, the vehicle power seat device disclosed in Japanese Utility Model registered No. 2577786 uses a feed screw device included in a first group mentioned in JP 5-288253 A. In the vehicle power seat device, it is requested to turn off the motor after adjustment of the seat position and maintain that position. Thus, in the vehicle power seat device disclosed in Japanese Utility Model registered No. 2577786, a small lead screw is used as a screw (9) shown in FIG. 1 and it is designed to lock itself with a nut (5). For the reason, the nut (5) is never moved due to a load even when a motor (7) is not powered on. However, because the lead of the screw (9) is small, the screw (9) needs to be rotated at a high speed in order to move the seat comfortably at a high speed, so that a burden applied to the motor (7) and a gear box (8) increases, thereby the price thereof being higher. Even if such an expensive price is permitted, the structure in which the screw (9) and the nut (5) keep a sliding contact with each other produces another inconvenience due to the friction when the screw (9) is rotated at high speeds.

Using the ball screw and roller screw included in a second or third group mentioned in JP 5-288253 A enables solving a problem about the friction between the screw and nut and securing a larger screw lead, thereby achieving a comfortable and quick feed. However, as an opposite effect to the advantage that these screws produce a very small friction, conversion between the rotary motion and the linear motion acts in both ways. That is, the self-lock is disabled. Different from the feed screw device in machine tools using a servo motor as its feed motor, the vehicle power seat device needs some kind of a lock mechanism because the motor power is kept off when it is not used. Thus, not only the device is likely to be expensive, but also if there exists any mechanical mechanism such as a gear between the lock mechanism and the ball screw, there is a fear that comfort of sitting on the seat worsens due to a backlash therebetween or lost motion such as distortion.

Accordingly, a still further object of the present invention is to provide a feed screw device which is capable of achieving a comfortable and quick feed without applying any burden on the motor or gear box and in which the self-lock function is activated when a torque from a driving source is interrupted although not continuously.

DISCLOSURE OF THE INVENTION

In order to achieve the above objects, according to the first embodiment, a multi-pitch screw wherein the thread of a screw is formed such that sections having a mild lead angle and sections having a steep lead angle are continuous alternately during a single turn along a spiral line.

As a result of such formation, the effective lead of the entire screw is an average of a section whose lead angle is mild and a section whose lead angle is steep. A resistant force against loosening of the screw is mostly occupied by a friction force against a mating member in the section whose lead angle is mild due to a force in the axial direction. Thus, a strong loosening blocking effect is exerted by the friction force in the section whose lead angle is mild, while a large effective lead is maintained.

The multi-pitch screw according to the second embodiment wherein the lead angle of said section having a mild lead angle is zero (flat).

Because the force in the axial direction changes to the friction force in the section whose lead angle is zero as a result of such formation, no component of force trying to rotate the screw acts, the friction force in the section whose lead angle is zero becomes stronger, exerting a stronger loosening blocking effect.

The multi-pitch screw according to the third embodiment wherein the lead angle of said section having a steep lead angle is steeper than a self-lock angle.

As a result of such formation, the average effective lead can be increased while the screw loosening blocking effect is maintained in the section whose lead angle is mild. Therefore, the screw can be tightened or a fastening nut can be advanced with a slight rotation.

The multi-pitch screw according to the fourth embodiment wherein said screw is a multi-threaded screw.

As a result of such formation, even if the average lead of a screw is large, the screw pitch can be set small, so that the friction force against screw loosening can be increased by the number of threads, thereby the screw loosening blocking effect being intensified. Although if it is intended to create a screw whose average lead is large by rolling, unreasonableness occurs in a material flow thereby yield dropping, in case of a multi-threaded screw, no unreasonableness occurs in the material flow because its pitch is small, so that the production is facilitated.

To facilitate understanding, the ninth-sixteenth embodiments about the invention of the nut will be described prior to description of the inventions according to the fifth-eighth embodiments. The screw and nut are in a mutually supplementary relation, so that the thread of the screw and the thread of the nut can be converted mutually to each other as completely equivalent elements. That is, the thread of the screw exerting effective operation and effect must exert the same operation and effect when it is applied to the thread of the nut. The inventions of the ninth-twelfth embodiments correspond to the inventions of the aforementioned first-fourth embodiments respectively.

According to the ninth embodiment, a multi-pitch nut wherein the thread of a female screw is formed such that a section in which the lead angle is mild and a section in which the lead angle is steep are arranged alternately and continuously during a single turn along the spiral line.

As a result of such formation, the effective lead of the entire nut is an average of a section whose lead angle is mild and a section whose lead angle is steep. A resistant force against loosening of the screw is mostly occupied by a friction force against a mating member in the section whose lead angle is mild due to a force in the axial direction. Thus, a strong loosening blocking effect is exerted by the friction force in the section whose lead angle is mild while a large effective lead is maintained.

The multi-pitch nut according to the tenth embodiment wherein the lead angle of the section in which said lead angle is mild is zero (flat).

Because the force in the axial direction changes to the friction force in the section whose lead angle is zero as a result of such formation, no component of force trying to rotate the screw acts, the friction force in the section whose lead angle is zero becomes stronger, exerting a stronger loosening blocking effect.

The multi-pitch nut according to the eleventh embodiment wherein the lead angle of said section having a steep lead angle is steeper than a self-lock angle.

As a result of such formation, the average effective lead can be increased while the screw loosening blocking effect is maintained in the section whose lead angle is mild. Therefore, the nut can be tightened or a fastening screw can be advanced with a slight rotation.

The multi-pitch nut according to the twelfth embodiment wherein said female screw is a multi-threaded screw.

As a result of such formation, even if the average lead of a screw is large, the screw pitch can be set small, so that the friction force against screw loosening can be increased by the number of threads, thereby the screw loosening blocking effect being intensified.

When any screw of the first-fourth embodiments is tried to be fastened with any nut of the ninth-twelfth embodiment, if the width of the thread of the screw is equal to the width of the screw groove like normal screws and nuts, in other words, if both faces of the flank can always make sliding contact with both faces of a mating flank, the screw and nut cannot be fastened with each other unless the thread is deformed plastically. Therefore, in these screws and nuts, the width of the screw groove is larger than the width of the thread, in other words, it is premised that only the pressure side flank keeps sliding contact while the play side flank is completely apart from the other flank. Even if there is a play between the play side flanks, a play is generated between the screw and nut during the fastening, however when the screw is tightened, the pressure side flanks fit to each other with a pressure, so that no problem occurs in the tightening procedure. If looseness during the fastening procedure makes embarrassment, the pressure side flanks can be urged to always fit to each other with an urging means such as a spring.

In the combination of the aforementioned screw and nut, a relative rotation position in which other thing can be tightened in a stable condition with the both is not every continuous position around 360° of a single turn, but only a rotation position in which a flank in a section whose screw lead angle is mild and a flank in a section whose nut lead angle is mild can be fit to each other. This is a feature point which is different from an ordinary screw and nut. If an attention is paid to that point that the screw and nut are fastened with each other though the fitting between the flanks in the section whose lead angle is mild, a conclusion that a purpose is satisfied if the thread of any one of the screw or nut exists only in the section whose lead angle is mild is reached. The reason is that the section whose lead angle is steep has only a function for guiding the other thread. Thus, the multi-pitch nut whose thread is partially missing has been proposed as the inventions according to the thirteenth-sixteenth embodiments.

The multi-pitch nut according to the thirteenth embodiment wherein said thread of the female screw does not exist but in partial section during a single turn along the spiral line and has sections in which the thread is missing.

As a result of such formation, production of the multi-pitch nut is facilitated. This is because a tool can be taken in or out through the missing section. That the missing section exists means that the thread of the female screw exists only partially. Because fine thread processing is conducted on only that partial section, the production is facilitated.

The multi-pitch nut according to the fourteenth embodiment wherein said threads of the female screw exist only at positions rotationally symmetrical to each other with respect to the axial line of the screw.

As a result of such formation, the force from the thread applied to the screw becomes symmetrical so that the force applied to the screw is not deflected. For example, if the peripheral length of a thread is short even if there is only a single thread, the applied force is necessarily deflected thereby a force inclining the screw and nut acting. This is not favorable. Therefore, if the thread is formed symmetrically, the applied force is symmetrical.

Further, the present invention assumes a multi-threaded screw and a multi-threaded nut. For example, when this is applied to the double threaded screw, if a nut thread exists at a position away by 180° from each other, each thread of the nut comes to contact with a flank of each different thread of the screw, so that force balance is easy to obtain. In case of triple-threaded screw, the threads of the nut exist at positions apart from each other by 120°, each of the nut makes contact with a flank of each different thread of the screw, so that the force balance is easy to obtain.

The multi-pitch nut according to the fifteenth embodiment wherein said thread of the female screw is formed with only a section in which said lead angle is zero (flat) and when the flank of the thread of the female screw keeps a facial contact with the pressure side flank in a section in which the lead angle of the thread of a male screw is zero, an end of the thread of the female screw keeps a linear contact with a position deflected in phase (position having a different rotation angle) on a play side flank of the male screw.

This embodiment can be understood easily if FIGS. 8(D) (E) and FIG. 16 are referred to. When the threads of the female screw exist intermittently, if the thread flanks contact both the pressure side and play side in the same phase, the step-like screw cannot rotate, so that it cannot fasten. For the reason, the width of the thread of the female screw is set smaller than the width of the screw groove of a male screw. By extending this narrow thread of the female screw in the direction that the phase delays, the end portion on the play side flank of the thread of the female screw makes linear contact with the play side flank at a position where the phase of the male screw delays. That is, the play side flanks make the linear contact with each other, the play side flank's function of guiding the thread of the female screw is exerted.

Therefore, as a result of such formation, even if the width of the thread of the female screw is smaller than that of the screw groove of the male screw, despite the step-like screw, the end of the play side flank of the female screw makes a sliding contact with the play side flank of the male screw and guides without urging. Consequently, the male screw and female screw can be fastened with each other without any looseness.

The multi-pitch nut according to the sixteenth embodiment wherein said thread of the female screw has sections in which said lead angle is zero (flat) and sections in which the lead angle is steep, these sections being continuous and in a phase where the flank of the thread of the female screw makes contact with the flank of the thread of the male screw, the pressure side flank of the male screw keeps a facial contact with the play side flank at a position deflected in phase (position having a different rotation angle).

This embodiment is understood easily if FIGS. 8(A), (B), (C) and FIG. 18 are referred to. In this case, the end face of the thread of the female screw is not rectangular but it has a slope corresponding to the section whose lead angle is steep at a portion whose phase is deflected (any one of a portion whose phase is advanced or retarded or both).

As a result of such formation, the slope corresponding to the section whose lead angle is steep of the thread of the female screw makes a sliding contact with the play side flank of the male screw if it is the portion whose phase is retarded. If it is the portion whose phase is advanced, that slope makes a sliding contact with the pressure side flank of the male screw and guides the nut. Thus, despite the step-like screw, the male screw and female screw can be fastened with each other without any looseness even if the nut is not urged with a spring. Further, because the facial contact is made, a high durability is ensured.

The thread of the screw and the thread of the nut are mutually supplementary and there is no problem if those functions are exchanged. Although an example that the thread of the nut is formed intermittent has been described in the above thirteenth-sixteenth embodiments, it is theoretically possible to form the thread of the nut continuous and the thread of the screw intermittent. Then, the fifth-eighth embodiments have been proposed as those corresponding to the thirteenth-sixteenth embodiments.

The multi-pitch screw according to the fifth embodiment wherein said thread of the screw does not exist but in partial section during a single turn along the spiral line and has sections in which the thread is missing.

The multi-pitch screw according to the sixth embodiment wherein said threads of the screw exist only at positions rotationally symmetrical to each other with respect to the axial line of the screw.

The multi-pitch screw according to the seventh embodiment wherein said thread of the screw is formed with only a section in which said lead angle is zero (flat) and when the flank of the thread of the screw keeps a facial contact with the pressure side flank in a section in which the lead angle of the thread of a female screw is zero, an end of the thread of the screw keeps a linear contact with a position deflected in phase (position having a different rotation angle) on a play side flank of the female screw.

The multi-pitch screw according to the eighth embodiment wherein said thread of the screw has sections in which said lead angle is zero (flat) and sections in which the lead angle is steep, these sections being continuous and in a phase where the flank of the thread of the screw makes contact with the flank of the thread of the female screw, the pressure side flank of the female screw keeps a facial contact with the play side flank at a position deflected in phase (position having a different rotation angle).

By fastening the multi-pitch screw with the multi-pitch nut described above, the feed screw device can be constructed. To construct the feed screw device, both the thread of the multi-pitch screw and the thread of the multi-pitch nut need to be continuous or at least one of them needs to be continuous. Then, an embodiment that the multi-pitch screw has the continuous thread while the multi-pitch nut has the continuous thread and the multi-pitch nut has the intermittent thread is regarded as the invention of the seventeenth embodiment. Then, an embodiment that the multi-pitch screw has the intermittent thread while the multi-pitch nut has continuous thread is regarded as the invention of the eighteenth embodiment. Of the inventions of the seventeenth embodiment, the embodiment important from viewpoints of the practical use is considered to be the embodiment that the multi-pitch screw has the continuous thread while the multi-pitch nut has the intermittent thread.

According to the seventeenth embodiment, a feed screw device wherein the multi-pitch screw described in any one of claims 1-4 and the multi-pitch nut described in any one of claims 9-16 are combined.

As a result of such formation, the multi-pitch screw having the continuous thread and the multi-pitch nut having the continuous or intermittent thread can be fastened with each other, thereby making it possible to construct the feed screw device. An average lead is secured large due to existence of the section whose lead angle is steep while a high-speed, comfortable feed is enabled. Further, contact by a section whose lead angle is mild enables self-lock to be achieved intermittently. Therefore, this is preferable as a feed screw device of automobile power seat.

Particularly, because the feed screw device in which the multi-pitch nut of the invention of the fifteenth or sixteenth embodiment is combined allows the play side flank of the thread of the nut to make a sliding contact with the play side flank of the screw through the linear contact or the facial contact for guide, there is such an effect that it can be fed smoothly without any looseness even if any urging means such as a spring is not used.

According to the eighteenth embodiment, a feed screw mechanism wherein the multi-pitch screw described in any one of claims 5-8 and the multi-pitch nut described in any one of claims 9-12 are combined. This is a feed screw device attained by exchanging the screw with the nut in the invention of the seventeenth embodiment.

One of the methods of manufacturing a multi-pitch nut constructing a female screw having the intermittent thread will be suggested. A multi-pitch nut manufacturing method for manufacturing the nut described in the nineteenth embodiment comprising:

an element step of forming an element sheet material in which a hole corresponding to a screw groove of a female screw is drilled and which has a thread protrusion corresponding to part of the thread of the female screw protruded toward the center of the hole from the periphery of the hole; and a stacking step of stacking the element sheet materials so that they are fixed integrally.

Consequently, the nut can be manufactured without a complicated hole cutting work through a nut blank in which a prepared screw hole is made. For example, first, an element sheet material in which as shown in FIG. 15, a thread protrusion corresponding to part of the thread of the female screw protruding toward the center of the hole from the periphery of the hole is formed. The element sheet material shown in FIG. 15 is easy to produce because this is not producing a hole in the nut blank but basically sheet processing. Next, the element sheet materials are stacked via spacer shown in FIG. 10 and bonded together. As a means for bonding, it is possible to consider tightening with a normal bolt and nut, welding, bonding with adhesive agent and the like. By stacking, a multi-pitch nut having multiple stages of female threads, only stacked, can be manufactured.

According to this manufacturing method, the element sheet material can be manufactured basically by processing the sheet-like material by pressing and the like and any complicated cutting work such as grooving is not necessary. Thus, there is such an excellent effect that a large number of the multi-pitch nuts can be provided.

BRIEF DESCRIPTION OF THE DRAWINGS

FIG. 5 is a perspective view showing a second multi-pitch nut;

DESCRIPTION OF THE PREFERRED EMBODIMENTS

The first embodiment of the present invention will be described with reference to the accompanying drawings.

Figure 1:
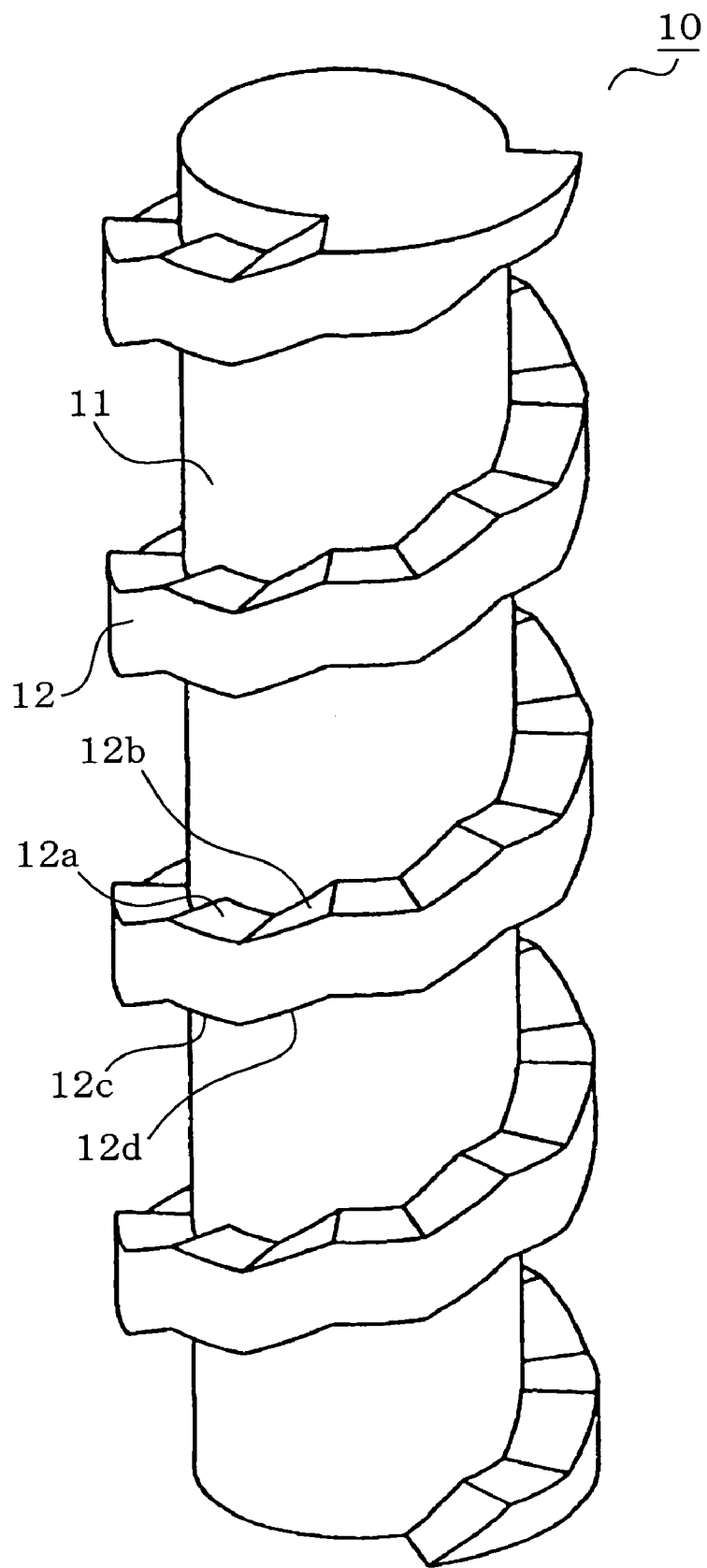
FIG. 1 is a perspective view showing a multi-pitch screw of a first embodiment.

FIG. 1 is a perspective view showing a multi-pitch screw 10 of the first embodiment. A thread 12 is formed along a spiral line on a cylindrical shaft portion 11. The thread 12 is a trapezoidal thread, in which flat sections 12a whose lead angle is zero and sections 12b whose lead angle is steep are continuous alternately on its flank. Hereinafter, the flat section 12a is called flat portion 12a while the steep section 12b is called slope portion 12b. Like in an advancement side flank, the flat portion 12c and the slope portion 12d exist on the follow-up side flank. The flat portion 12a and the slope portion 12b come alternately every ¹⁄₁₆ turns, which is obtained by dividing a single rotation along the spiral line by 16, that is, every 22.5°. Therefore, it comes that the average lead angle of this screw is half the inclination of the slope portion 12b.

As evident from the same Figure, the width of the screw groove is extraordinarily large as compared to the width of the thread 12. This reason is to allow a nut having a continuous thread in which the flat portions and the slope portions come alternately to be fastened. For example, it is so constructed that the diameter of the shaft portion 11 is φ13.7 mm, the width of the thread 12 is 4 mm, the height of the thread 12 is 3 mm, the width of the screw groove is 12 mm and the average lead of the screw 10 is 16 mm. Such a multi-pitch screw 10 can be manufactured easily by rolling.

Figure 2:
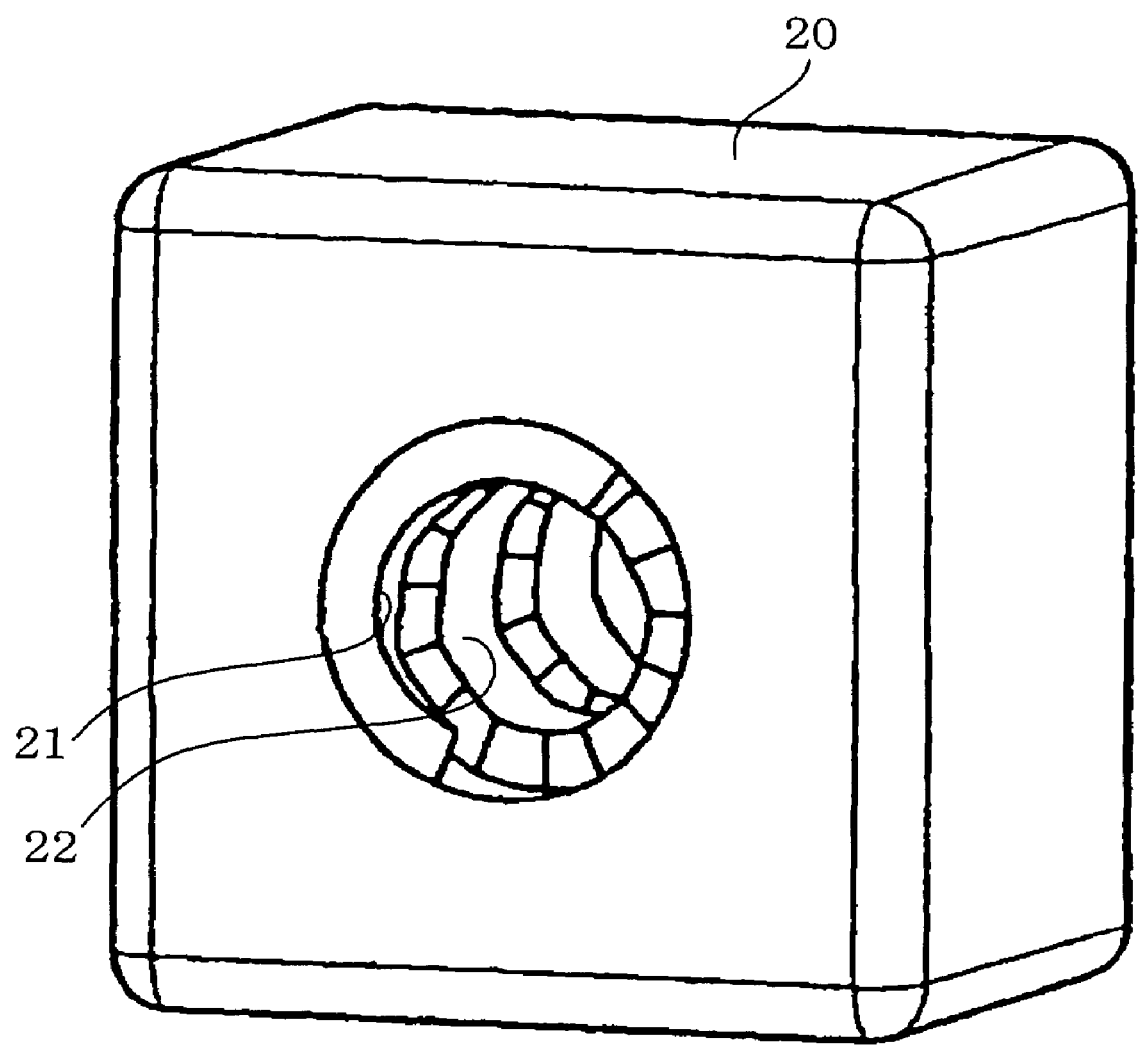
FIG. 2 is a perspective view showing a multi-pitch nut which is to be fastened with the multi-pitch screw shown in FIG. 1.

FIG. 2 is a perspective view showing a multi-pitch nut 20 which is to be fastened with the multi-pitch screw 10 shown in FIG. 1. The multi-pitch nut 20 is a square nut, in the center of which a screw hole 21 is made. In the screw hole 21, a screw groove is engraved so that a female thread 22 is formed.

Figure 3:
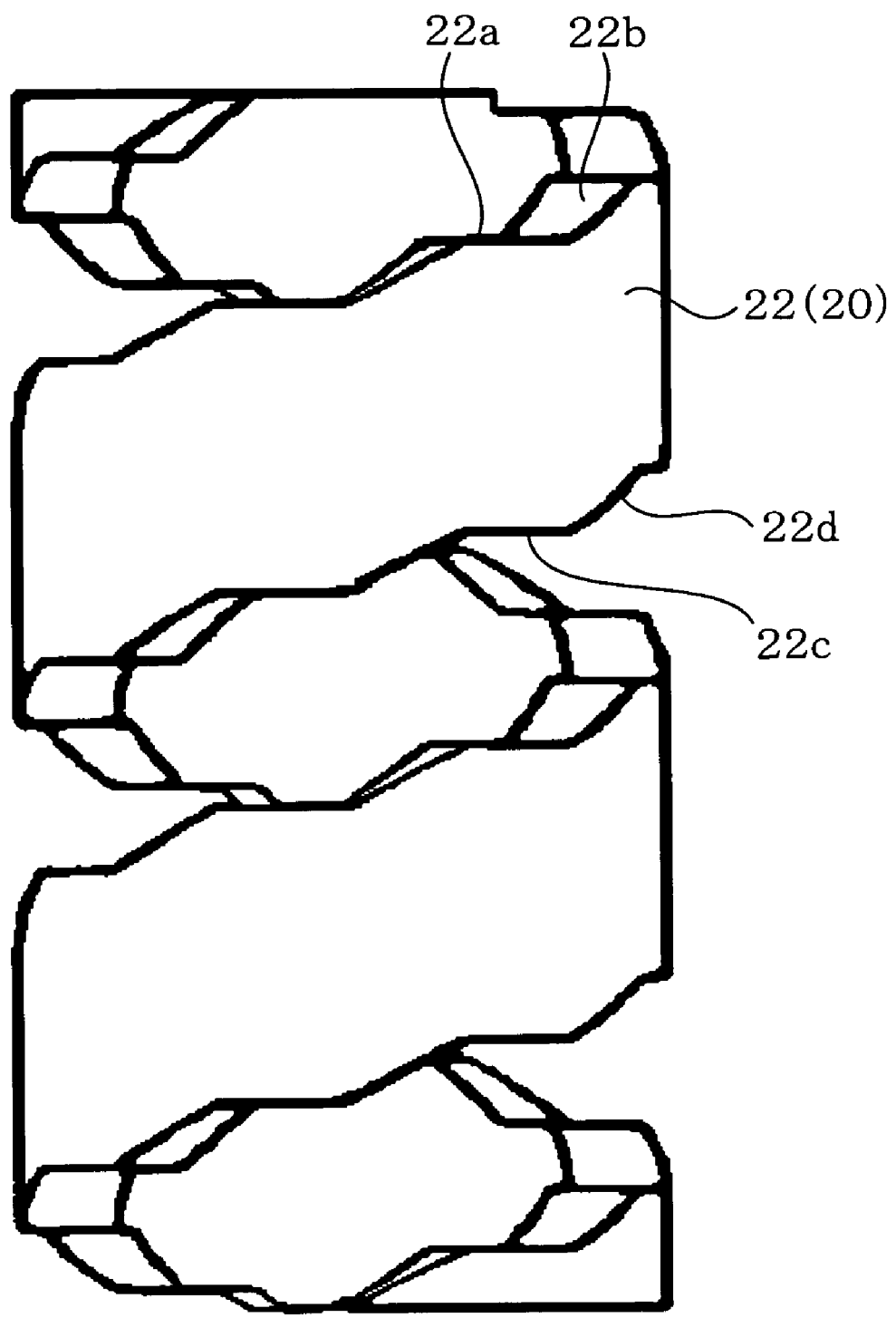
FIG. 3 is a front view conceptually showing only the threads of the multi-pitch screw shown in FIG. 2 by extracting.

FIG. 3 is a front view conceptually showing only the threads 22 of the multi-pitch nut 20 shown in FIG. 2 by extracting. The thread 22 is a trapezoidal thread screw, in which flat sections 22a whose lead angle is zero and sections 22b whose lead angle is steep are continuous alternately on its flank. Hereinafter, the flat section 22a is called flat portion 22a while the steep section 22b is called slope portion 22b. Like in an advancement side flank, the flat portion 22c and the slope portion 22d exist on the follow-up side flank. The flat portion 22a and the slope portion 22b come alternately every ¹⁄₁₆ turns, which is obtained by dividing a single rotation along the spiral line by 16, that is, every 22.5. Thus, the average lead angle of the female screw is half the inclination of the slope portion 22b. This lead and pitch match those of the multi-pitch screw 10 shown in FIG. 1. This is because fastening between the multi-pitch screw 10 and the multi-pitch nut 20 is enabled.

The flat portions 22a, 22c and the slope portions 22b, 22d of the female screw are constructed in a shape and dimension corresponding to the flat portions 12a, 12c and the slope portions 12b, 12d of the thread 12 of the multi-pitch screw 10. The abstract outside diameter (more specifically, inner diameter of the screw groove) of the thread 22 of the nut 20 is φ20.3 mm and the height of the thread 22 is 3 mm. The width of the thread 22 is 9.4 mm and the width of the screw groove is 6.6 mm. The thickness (height in the Figure) of the nut 20 is 38.6 mm. The width (6.6 mm) of the screw groove is set larger than the width (4 mm) of the thread 12 of the male screw 10. This reason is that fastening between the multi-pitch screw 10 having the flat portion and the multi-pitch nut 20 is enabled. Such a multi-pitch nut 20 can be created by grooving in a nut blank having a prepared hole by numerical control cutting processing. Alternatively, the nut blank is divided to halves along the axial direction, each divided nut blank is subjected to processing such as pressing, so as to form the thread 22 and after that, both the halves are joined together.

Figure 4:
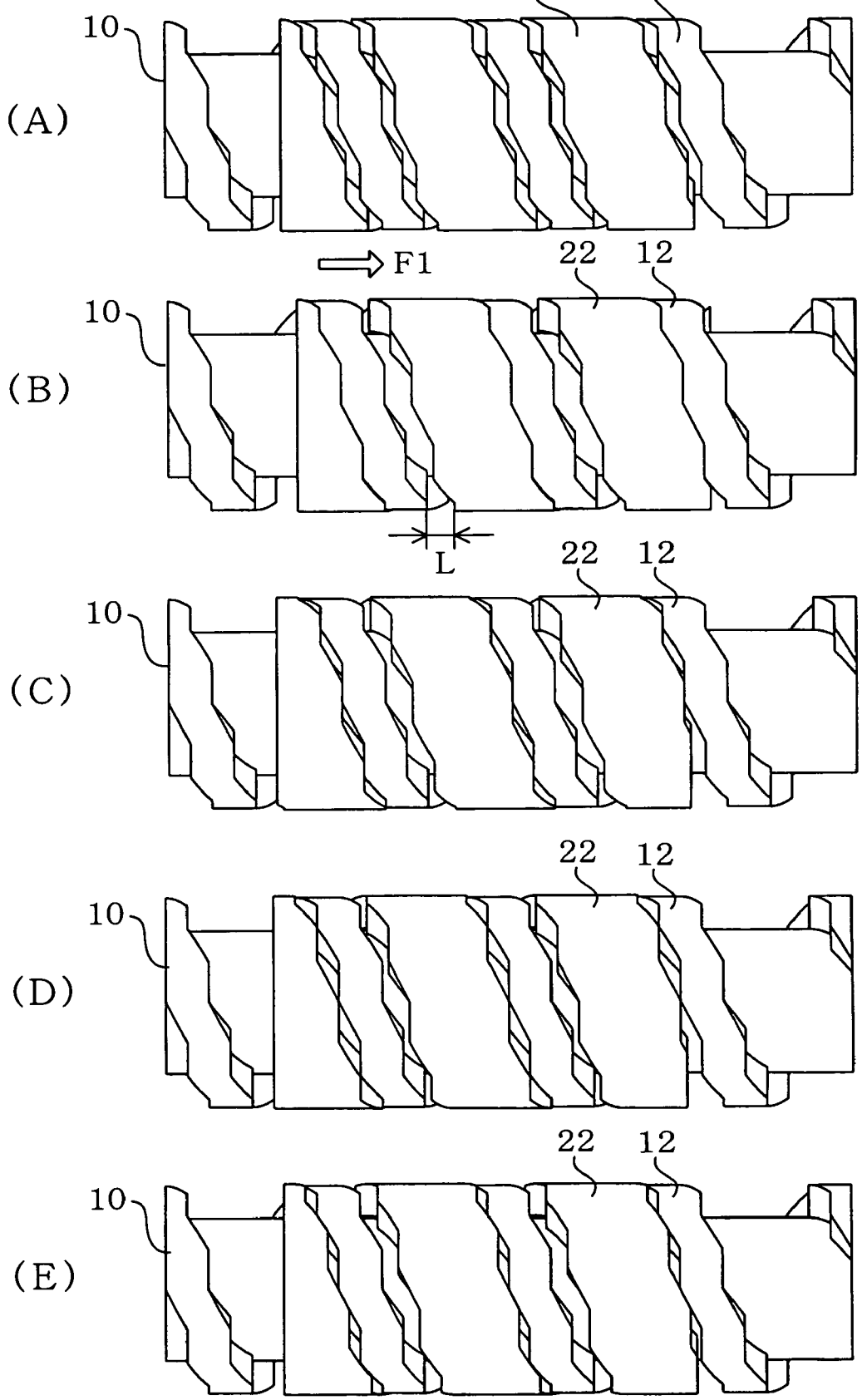
FIG. 4 is a front view showing the state in which the multi-pitch nut shown in FIG. 2 is fastened with the multi-pitch screw shown in FIG. 1.

FIG. 4 is a front view showing the state in which the multi-pitch nut 20 shown in FIG. 2 is fastened with the multi-pitch screw 10 shown in FIG. 1. It is assumed that the multi-pitch screw 10 has a head on the left side of this Figure. To express the fastening condition clearly, the multi-pitch nut 20 is represented as a conceptual abstract object having only the thread 22 shown in FIG. 3. FIG. 4(A) shows a condition in which the thread 12 of the multi-pitch screw 10 and the thread 22 of the multi-pitch nut 20 only fasten with each other so that they do not apply forces to each other. In this condition, there exists a gap between the flank of the thread 12 of the multi-pitch screw 10 and the flank of the thread 22 of the multi-pitch nut 20 both on the advancement side flank and follow-up side flank.

FIG. 4(B) shows a case where an urging force is applied to the multi-pitch nut 20 in the direction of an arrow F1 with a spring means (not shown). In this case, the pressure side flank of the thread 22 of the multi-pitch nut 20 fits to the pressure side flank of the thread 12 of the multi-pitch screw 10, so that a gap L indicated in the same Figure is generated between the play side flanks of both the threads 12, 22. Assume that with this condition, a strong force is applied to the multi-pitch nut 20 in the direction of the arrow F1 along the axial direction. In this case, a component of force which tries to rotate the multi-pitch screw 10 is generated due to a contact between the slope portions of the pressure side flanks. However, a friction force F proportional to a force N of F=μN (μ is a friction coefficient and N is a force in the axial direction) is generated in the flat portion due to a contact between the flat portions of the pressure side flanks. The friction force F is always stronger than the component of force from the slope portion which tries to rotate the multi-pitch screw 10. Therefore, even if the strong force is applied in the direction of the arrow F1 along the axial direction, the multi-pitch screw 10 is never rotated and its position is maintained. That is, the self-lock is activated.

If the multi-pitch screw 10 is turned to the left slightly from this condition, the state shown in FIG. 4(C) is attained. Under this condition, in the pressure side flanks of the threads 12, 22 of the multi-pitch screw 10 and multi-pitch nut 20, the slope portions are released from the contact state. However, because the flat portions keep in the contact state, the multi-pitch nut 20 maintains its axial position so that it does not move. Further, if the multi-pitch screw 10 is turned to the left, the state shown in FIG. 4(D) is reached. Under this state, the respective threads 12, 22 keep in contact with each other through an edge where the flat portion of the pressure side flank of each of the threads 12, 22 changes to the slope portion. Although this is an unstable condition, the multi-pitch nut 20 does not move up to this rotation position. If the multi-pitch screw 10 is turned further to the left, the state shown in FIG. 4(E) is reached. With this condition, the slope portions of the pressure side flank of the respective threads 12, 22 keep in contact with each other while the flat portions are released from the contact state. Then, with a rotation of the multi-pitch screw 10, the multi-pitch nut 20 is fed in the axial direction. In the meantime, the self lock is not activated because the slope of the flank is steep.

If the multi-pitch screw 10 is turned to the left, the state shown in FIG. 4(B) is regained. In this case, the flat portions and slope portions kept in contact in the pressure side flank of the respective threads 12, 22 deflect by one, so that it comes that the multi-pitch nut 20 moves to the right axially by only a distance in the axial direction corresponding to a flat portion adjacent across a slope portion. That is, the multi-pitch nut 20 is not fed continuously following a rotation of the multi-pitch screw 10 but it is fed by step only when the rotation position shown in FIG. 4(E) is gained. In other words, with the rotation of the multi-pitch screw 10, the multi-pitch nut 20 repeats being fed and stopped intermittently. In the meantime, when the rotation of the multi-pitch screw 10 stops, it stops such that the flat portions keep contact with each other stabilizing a force applied to the multi-pitch nut 20 as shown in FIGS. 4(B), 4(C) due to a reaction force of the driving system or an urging force of the spring for urging the multi-pitch nut 20 in an axial direction. In this condition, the self lock is activated.

Although in the above explanation, a case where the multi-pitch nut 20 is fed rightward by rotating the multi-pitch screw 10 counterclockwise has been described to facilitate understanding based on the drawing, the same thing happens if the multi-pitch nut 20 is fed leftward in the Figure by rotating the multi-pitch screw 10 clockwise or in case of a tightening device, it is rotated in the tightening direction. In case of rightward rotation, the state changes in the order of FIG. 4(B)-FIG. 4(E)-FIG. 4(D)-FIG. 4(C)-FIG. 4(B). Although an example that the multi-pitch nut 20 is fed by rotating the multi-pitch screw 10 has been described, it is apparent that the same thing can be said even if the multi-pitch nut 20 is turned.

Although in the above description, it is stated that the multi-pitch nut 20 is fed by step with a rotation of the multi-pitch screw 10, this is no problem if it is used as a feed screw device in most cases. For example, assuming that this is applied to a vehicle power seat, the multi-pitch screw 10 is driven at a quick rotation speed of about 5 turns/second. Because the flat portions and slope portions of the flank are constructed in a condition where a single turn is divided by 16, it is fed at a frequency of 8×5=40 times per second, so that substantially it is fed smoothly with an average lead of the slope portion and flat portion of the respective threads 12, 22.

Although for the above described embodiment, the feed screw device comprising the multi-pitch screw 10 and the multi-pitch nut 20 has been mentioned, as a second embodiment, a tightening device comprising the multi-pitch screw 10 and multi-pitch nut 20 can be imagined. In this case, a strong force indicated with an arrow F1 in FIG. 4(B) is applied to the multi-pitch nut 20 due to a reaction force due to elastic deformation of an object to be tightened. Thus, it cannot stay stably in the state in which only the slope portions on the flank make contact with each other as shown in FIGS. 4(E), 4(D) and it keep a stable condition only when the flat portions on the flank make a firm contact with each other as shown in FIGS. 4(B), 4(C). With this condition, a strong rotation resistant friction force is generated due to the firm contact between the flat portions of the flank, so that it is possible to provide a multi-pitch screw and multi-pitch nut which are not loosened due to a vibration or the like and ensures a highly reliable tightening. In case where the multi-pitch screw 10 and multi-pitch nut 20 are used not as a feed screw device but as a tightening device, the average lead of the multi-pitch screw 10 is too large if it is set to 16 mm. If the average lead is set to about 2 mm like ordinary screws, the state in which the flat portions of the flank keep in firm contact with each other appears every ⅖ mm, so that it is possible to provide a tightening device which has no problem for actual use.

Further, the multi-pitch screw 10 and multi-pitch nut 20 whose average lead is set to a small value can be used as an adjusting screw also. Using the multi-pitch screw 10 and multi-pitch nut 20 having a small average lead, the multi-pitch nut 20 is fixed to an appliance or device and the multi-pitch screw 10 is fastened therewith. For example, if this is used as an adjusting screw for securing the horizontal level for a desk, table, refrigerator or the like, it can be adjusted easily and further, it is available as an adjusting screw which never gets in disorder.

In the above-described embodiments, the thread 22 of the female screw of the multi-pitch nut 20 is formed continuous along the spiral line. Thus, to fasten the threads 12, 22 each comprising the flat portions 12*a*, 22*a* and the slope portions 12*b*, 22*b* with each other, it is necessary to provide a gap (play) between the thread 12 of the multi-pitch screw 10 and the thread 22 of the multi-pitch nut as shown in FIG. 4(A). If an attention is paid to the multi-pitch nut 20, considering its operation at a rotation position allowing the self lock to be activated when it is used as a feed screw device and the operation at the rotation position allowing the self lock to be activated when it is used as a tightening device, it is noticed that as shown in FIG. 3, only the flat portion 22*a* of the thread 22 of the multi-pitch nut 20 is activated while the slope portion 22*b* is doing no work. The slope portion 22*b* only operates as a guide when the multi-pitch screw 10 is turned.

That is, it is finally concluded that the thing absolutely necessary as the thread 22 of the multi-pitch nut 20 is only the flat portion 22*a*. Then, if the imagination is turned over, the function probably can be attained even if the thread of the multi-pitch nut is formed discontinuous with only the flat portion left. That is, the thread of the female screw exists only in an interval of a single turn along the spiral line, so that the thread has missing portions. Further, as long as a strength as the thread is permitted, even if all the eight flat portions obtained by dividing a single turn by 16 along the spiral line do not exist, the function can be maintained if some of them exist. It is preferable that the remaining portions of the thread are located at symmetrical positions with respect to the center of the axial line of the screw from viewpoints for balancing a force applied to the multi-pitch nut.

FIG. 5 is a perspective view showing the second multi-pitch nut 30. FIG. 5(A) is a perspective view thereof and FIG. 5(B) is a perspective view showing the interior. The second multi-pitch nut 30 is a square nut, which has a screw hole 31 in the center. Five thread protrusions 32 are formed in the screw hole 31. This thread protrusion 32 is formed as if only part of the flat portions 22*a*, 22*c* of the thread of the female screw shown in FIG. 3 is left. Of the thread protrusions 32, three are formed on the left of this Figure while two are formed on the right and the right/left thread protrusions 32 are formed at symmetrical positions with respect to the axial line of the thread such that they are apart from each other by 180°. The axial position of each thread 32 deflects by one pitch. Such a multi-pitch nut 30 can be manufactured by cutting a ring-like groove in the prepared hole of the screw hole 31 and after that, cutting its inner peripheral face with an appropriate width along the axial line.

Figure 6:
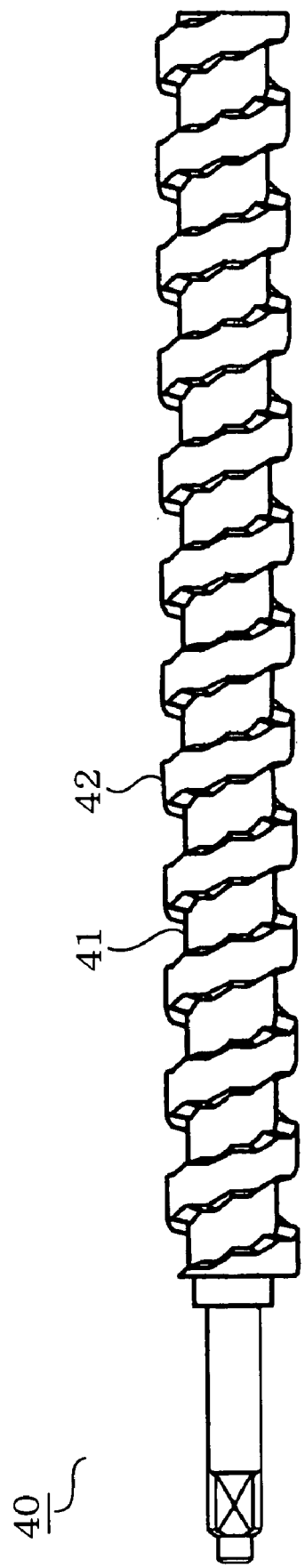
FIG. 6 is a front view showing the multi-pitch feed screw which is to be fastened with the second multi-pitch nut.

FIG. 6 is a front view showing the multi-pitch feed screw 40 which is to be fastened with the second multi-pitch nut 30. This multi-pitch feed screw 40 is used for an automobile power seat. This multi-pitch feed screw 40 is a single-thread multi-pitch screw, which is formed so that the lead of a thread 42 is 16 mm and the stroke is about 200 mm. The outside diameter of the multi-pitch feed screw 40 (outside diameter of the thread 42) is φ20 mm, the effective diameter is φ18 mm and the diameter of the shaft portion 41 is φ13.7 mm.

Figure 7:
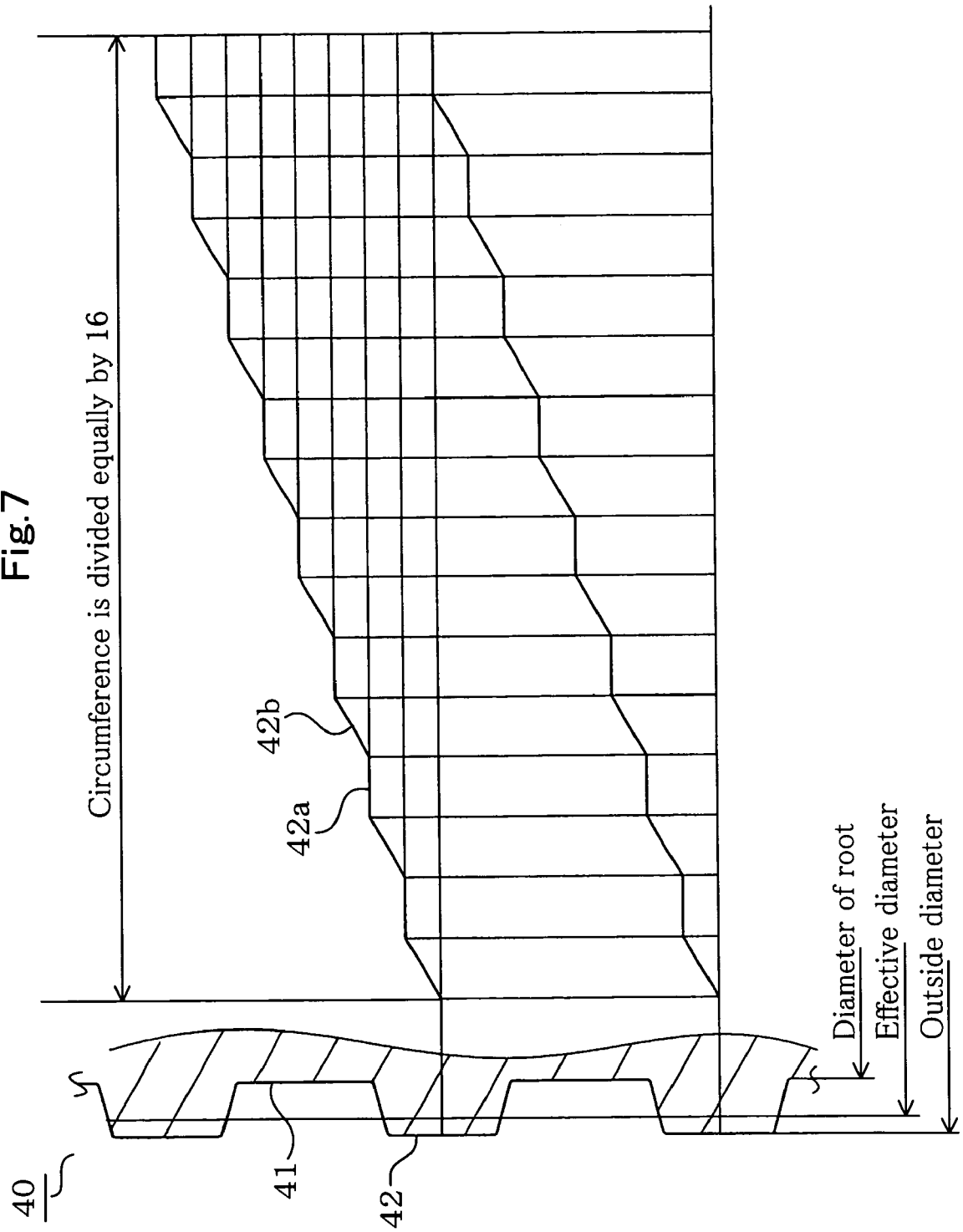
FIG. 7 is a development diagram showing the development of the thread shape and lead of the multi-pitch feed screw over 360°.

FIG. 7 is a development diagram showing the development of the shape of the thread 42 and lead of the multi-pitch feed screw 40 over 360°. The multi-pitch feed screw 40 is a trapezoidal screw thread and the diameter of its root is φ13.7 mm, the effective diameter is φ18.0 mm and the outside diameter is φ20.0 mm. The pitch (lead) of the thread 42 is 16 mm. The thread 42 is divided equally by 16 in the circumferential direction so that a flat section 42a in which the lead angle of the thread 42 is zero (hereinafter referred to as flat portion 42a) and a section 42b which is a steep slope at an angle near 30° (hereinafter referred to as slope portion 42b) come alternately. Thus, the thread 42 passes a single pitch through eight steps.

Figure 8:
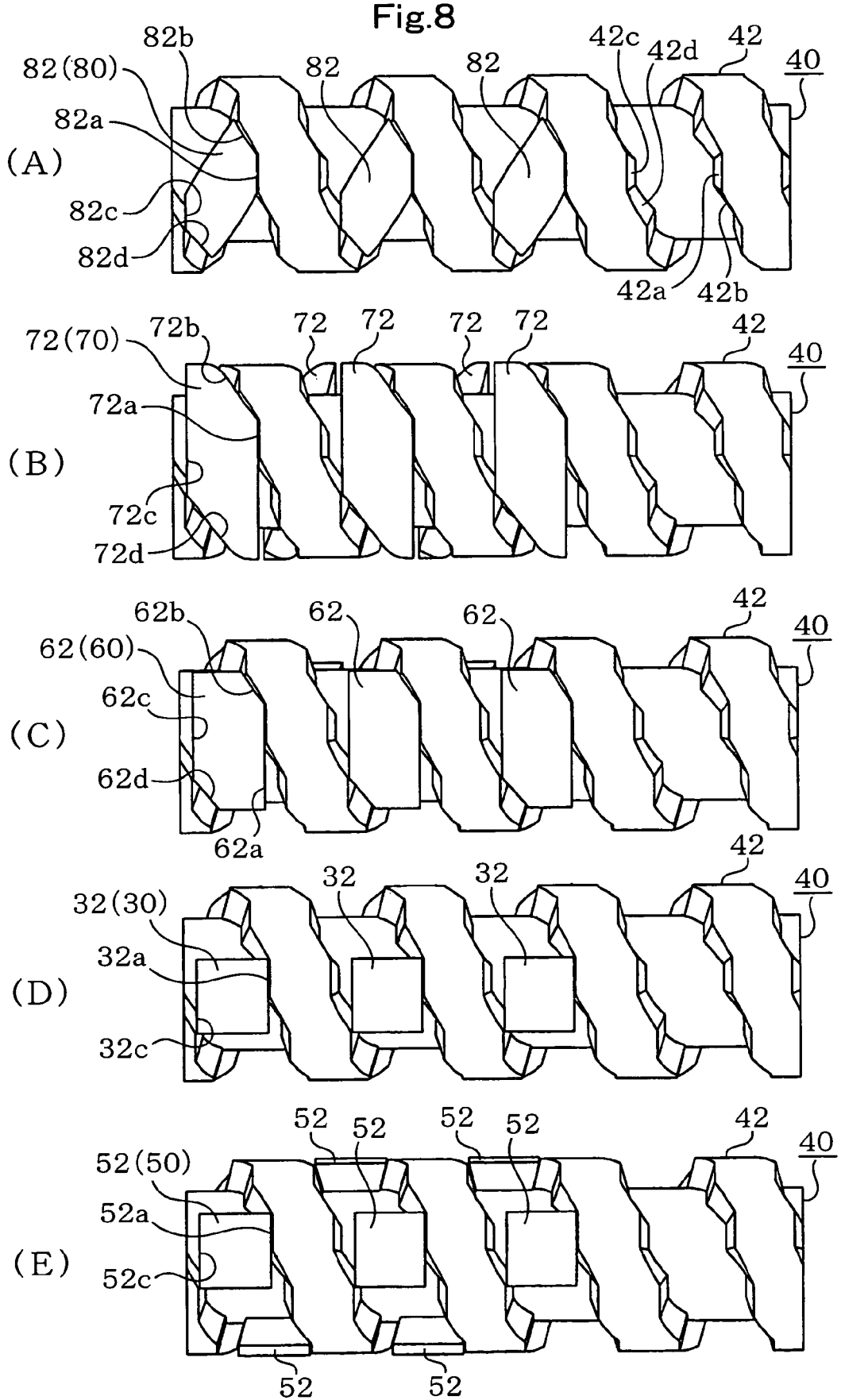
FIG. 8 is a front view showing the fastening condition between the multi-pitch feed screw and various multi-pitch nuts.

FIG. 8 is a front view showing the fastening condition between the multi-pitch feed screw 40 and various multi-pitch nuts. The multi-pitch nut is a multi-pitch nut in which the thread of its female screw exists only in an interval so that the thread has missing portions. The entire multi-pitch nut is not expressed but only its intermittent thread protrusion portion is expressed by extraction like FIG. 3 with respect to FIG. 2.

FIG. 8(D) shows the fastening between the second multi-pitch nut 30 described above and shown in FIG. 5 and the multi-pitch feed screw 40 shown in FIG. 6. About the thread protrusion 32 of the second multi-pitch nut 30, the flat portion 32a of the advancement side flank is longer than the flat portion 42a of the thread 42 on the multi-pitch feed screw 40 and extends downward in the same Figure while the length is equal to a sum of the flat portion 42a and the slope portion 42b of the multi-pitch feed screw 40. That is, this is 2/16 as long as the circumference. The thread protrusion 32 is formed thick and this thickness allows, when the flat portion 32a on the advancement side flank keeps a sliding contact with the flat portion 42a of the thread 42, the flat portion 32c of the follow-up flank to keep contact with the flat portion 42c of a thread 42 deflected by one in terms of phase. The thread protrusion 32 is formed in a square shape like this. Thus, at a rotation position where one flat portion 32a of the thread protrusion 32 keeps a sliding contact with part of the flat portion 42a on the advancement side of the multi-pitch feed screw 40, the other flat portion 32c of the thread protrusion 32 keeps a sliding contact with the flat portion 42c on the follow-up side of the multi-pitch feed screw 40. At the rotation position where the second multi-pitch nut 30 is stopped in the axial direction, the second multi-pitch nut 30 is guided through facial contact.

When the thread protrusion 32 approaches the slope portion 42b of the thread 42 of the multi-pitch feed screw 40, edges of the flat portions 32a, 32c of the thread protrusion 32 or the ridge thereof make a contact with the slope portions 42b, 42d of the thread 42. That is, at a rotation position where the second multi-pitch nut 30 is fed in the axial direction, the ridge of the thread protrusion 32 makes a linear contact with the slope portions 42b, 42d so that the second multi-pitch nut 30 is guided. Therefore, according to this embodiment, no gap is generated between the thread 42 and the flank of the multi-pitch feed screw 40 while keeping in the linear contact, and the multi-pitch nut 30 can be fed without any play. This is an advantage which has not been found in the first embodiment described about FIG. 4.

FIG. 8(E) is a front view showing the condition that the third multi-pitch nut 50 and the multi-pitch feed screw 40 are fastened with each other. Nine thread protrusions 52 are arranged along the spiral line at every 90° in the multi-pitch nut 50. The configuration of each thread protrusion 52 is the same as that thread protrusion 32 of the second multi-pitch nut 30. Therefore, the operation is the same as that described about the above FIG. 8(D). The flat portions 52a, 52c of the thread protrusion 52 make sliding contact with the flat portions 42a, 42c of the thread 42. This embodiment has such an advantage that the strength and durability of the multi-pitch nut 50 are improved because the quantity of the thread protrusions 52 is larger.

FIG. 8(C) is a front view showing the fastening condition between the fourth multi-pitch nut 60 and the multi-pitch feed screw 40. Here, the length of the thread protrusion 62 of the multi-pitch nut 60 is extended up to a length corresponding to 4/16 turns of the circumference. Five thread protrusions 62 are provided. Each thread protrusion 62 has flat portions 62a, 62c corresponding to the length of 3/16 turn and slope portions 62b, 62d corresponding to the length of 1/16 turn on both the advancement side flank and follow-up side flank. The slope portions 62b, 62d are formed with a lead angle corresponding to the slope portions 42b, 42d of the multi-pitch feed screw 40. With such a configuration, at a rotation position where part of one flat portion 62a of the thread protrusion 62 keep a sliding contact with the flat portion 42a on the advancement side of the multi-pitch feed screw 40, part of the other flat portion 62c of the thread protrusion 62 makes a sliding contact with the flat portion 42c on the follow-up side of the multi-pitch feed screw 40. That is, at a rotation position where the fourth multi-pitch nut 60 stops in the axial direction, the fourth multi-pitch nut 60 is guided through a facial contact.

When the thread protrusion 62 approaches the slope portion 42b of the thread 42 on the multi-pitch feed screw 40, the slope portions 62b, 62d of the thread protrusion 62 make a sliding contact with the slope portions 42b, 42d of the thread 42. That is, at a rotation position where the fourth multi-pitch nut 60 is fed in the axial direction, the slope portions 62b, 62d of the thread protrusion 62 make facial contact with the slope portions 42b, 42d of the multi-pitch feed screw 40, so that the fourth multi-pitch nut 60 is guided. At a moment when the contact between the flat portions 62a/62c and 42a/42c changes to the contact between the slope portions 62b/62d and 42b/42d, a linear contact is generated. FIG. 8(C) indicates that position. Thus, according to this embodiment, the multi-pitch nut 60 can be fed without forming a gap between the thread 42 of the multi-pitch feed screw 40 and the flank, that is, without any play and the thread protrusion 62 of the multi-pitch nut 60 and the thread 42 of the multi-pitch feed screw 40 make facial contact with each other at almost any rotation position except a momentary rotation position, thereby providing such an advantage that the mechanical strength and durability are excellent.

FIG. 8(B) is a front view showing the fastening condition between the fifth multi-pitch nut 70 and the multi-pitch feed screw 40. Here, the length of the thread protrusion 72 on the multi-pitch nut 70 is extended up to a length corresponding to 6/16 turn of the circumference. Five thread protrusions 72 are provided. Part of two ends of a thread protrusion 72 located on an opposite side is seen from this side. Each thread protrusion 72 comprises flat portions 72a, 72c having a length corresponding to 4/16 turn and slope portions 72b, 72d having a length corresponding to 2/16 turn on both the advancement side flank and follow-up side flank. The slope portions 72b, 72d are formed with a lead angle corresponding to the slope portions 42b, 42d of the multi-pitch feed screw 40. Because with such a configuration, the volume of each thread protrusion 72 is enlarged, this has such an advantage that the mechanical strength and durability are excellent.

FIG. 8(A) is a front view showing the fastening condition between the sixth multi-pitch nut 80 and the multi-pitch feed screw 40. The thread protrusion 82 in the multi-pitch nut 80 is formed by, with only a portion necessary for sliding contact between the multi-pitch feed screw 40 and the thread 42 left, cutting out other remaining portion. Five thread protrusions 82 are provided. Each thread protrusion 82 has a flat portion 82a having a length corresponding to 1/16 turn and a slope portion 82b advanced by only a phase and having a length corresponding to 1/16 turn on its advancement side flank. The follow-up side flank comprises a flat portion 82c which is delayed by a phase from the flat portion 82a on the advancement side flank and has a length corresponding to 1/16 turn and a slope portion 82d which is delayed further by a phase and having a length corresponding to 1/16 turn. Therefore, the thread protrusion 82 has a diamond shape. The slope portions 82b, 82d are formed with a lead angle corresponding to the slope portions 42b, 42d of the multi-pitch feed screw 40. With such a configuration, it is possible to realize the thread protrusion 82 with which the thread 42 of the multi-pitch feed screw 40 can make a facial contact without any play with a minimum volume. Thus, a large space is secured around the thread protrusion 82 thereby facilitating the manufacturing.

Figure 9:
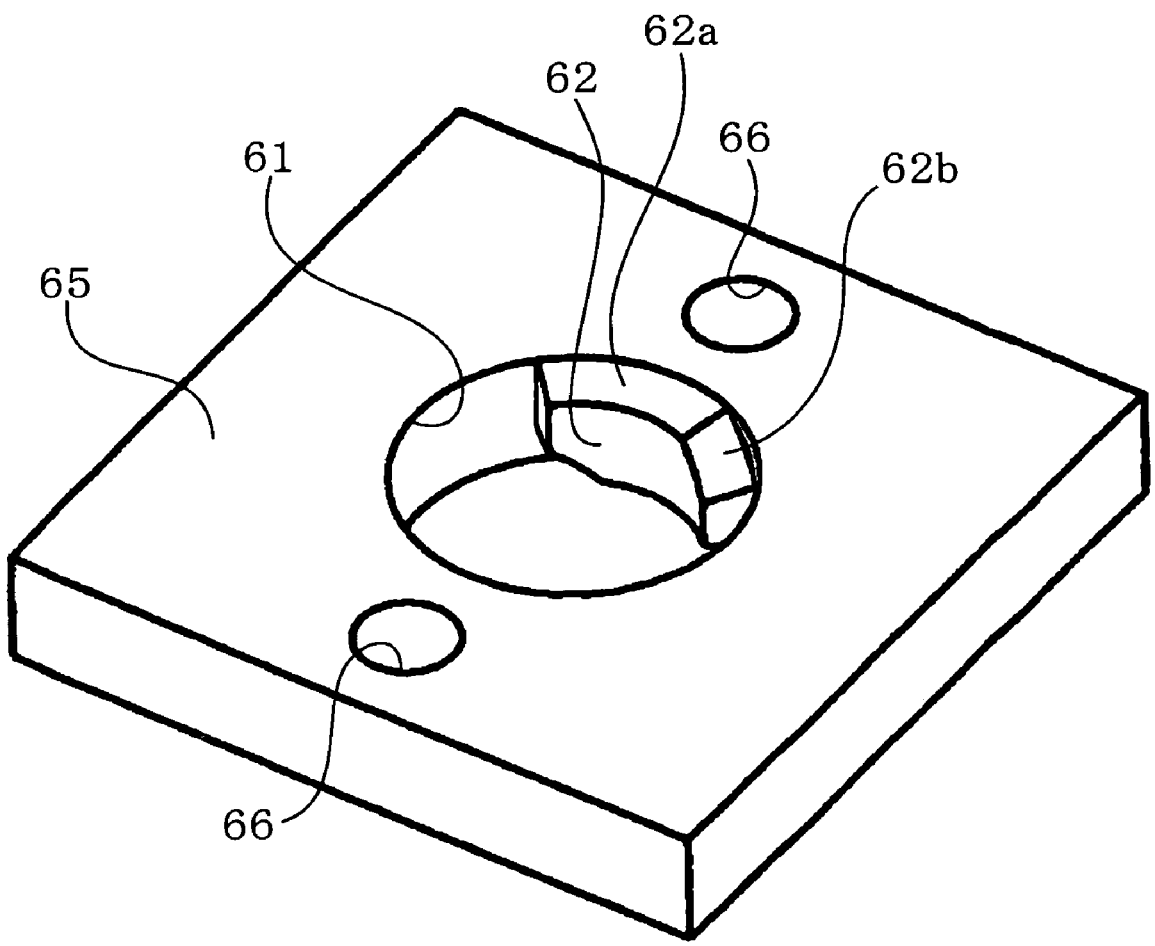
FIG. 9 is a perspective view showing the element sheet material of a fourth multi-pitch nut.

FIG. 9 is a perspective view showing an element sheet material 65 of a fourth multi-pitch nut 60 shown in FIG. 8(C). A hole corresponding to a screw hole 61 is made in the center of an element sheet material, which is a square sheet material having a predetermined thickness and a single thread protrusion 62 is formed on part of the periphery of that screw hole 61. The thread protrusion 62 is comprised of a flat portion 62a having a length corresponding to 3/16 turn and a slope portion 62b having a length corresponding to 1/16 turn. Two holes 66 are formed in the side portion of the element sheet material 65. This element sheet material 65 can be manufactured easily at a high precision by pressing a sheet material.

Figure 10:
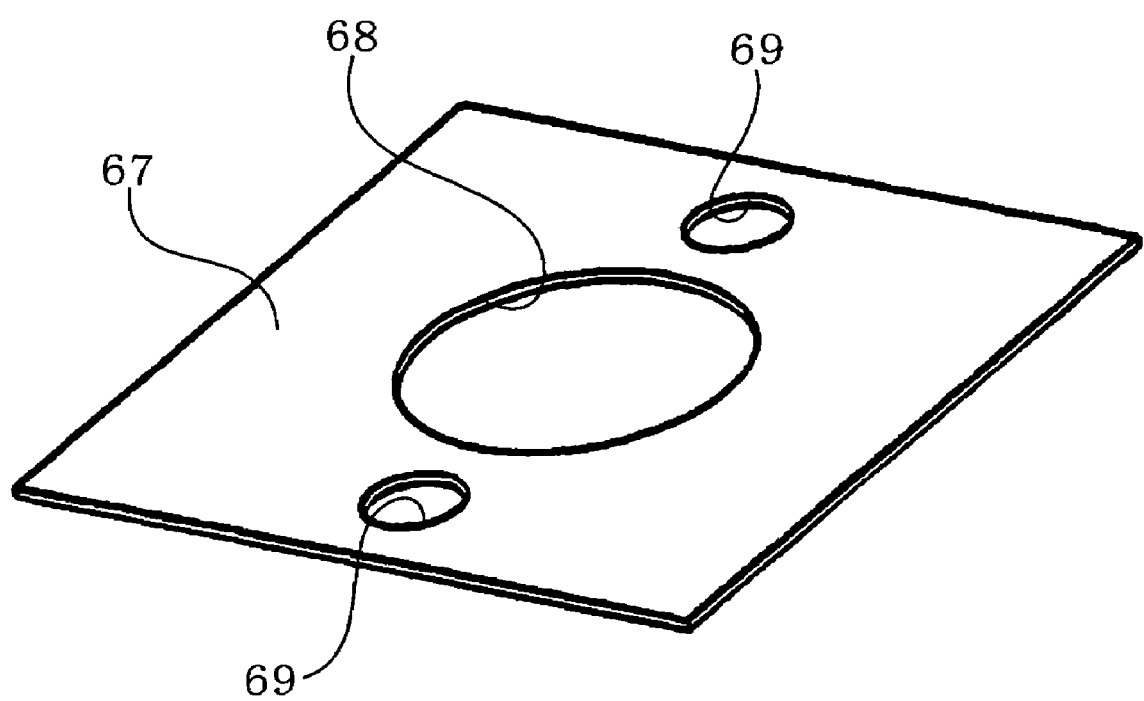
FIG. 10 is a perspective view showing a spacer which is an element of the multi-pitch nut.

FIG. 10 is a perspective view showing a spacer 67 which is an element of the multi-pitch nut. A spacer 67 is formed with a hole 68 corresponding to the screw hole 61 in the center of a square sheet material having a predetermined thickness and two holes 69 in the side portions. This spacer 67 can be manufactured easily at a high precision by pressing a sheet material. Then, five element sheet materials 65 and four spacers 67 are prepared. The element sheet materials 65 are stacked with each spacer 67 interposed between the element sheet materials by turning the position thereof every 180° and bolts are inserted into the two holes 66, 69 and fixed with nuts so as to complete the fourth multi-pitch nut 60. After tightened with the bolts and nuts, these may be welded together. Further, after determining the position of the element sheet materials 65 and spacers 67 by inserting a positioning pin into each of the two holes 66, 69, it is permissible to fasten the respective element sheet materials 65 and spacers 67.

Figure 11:
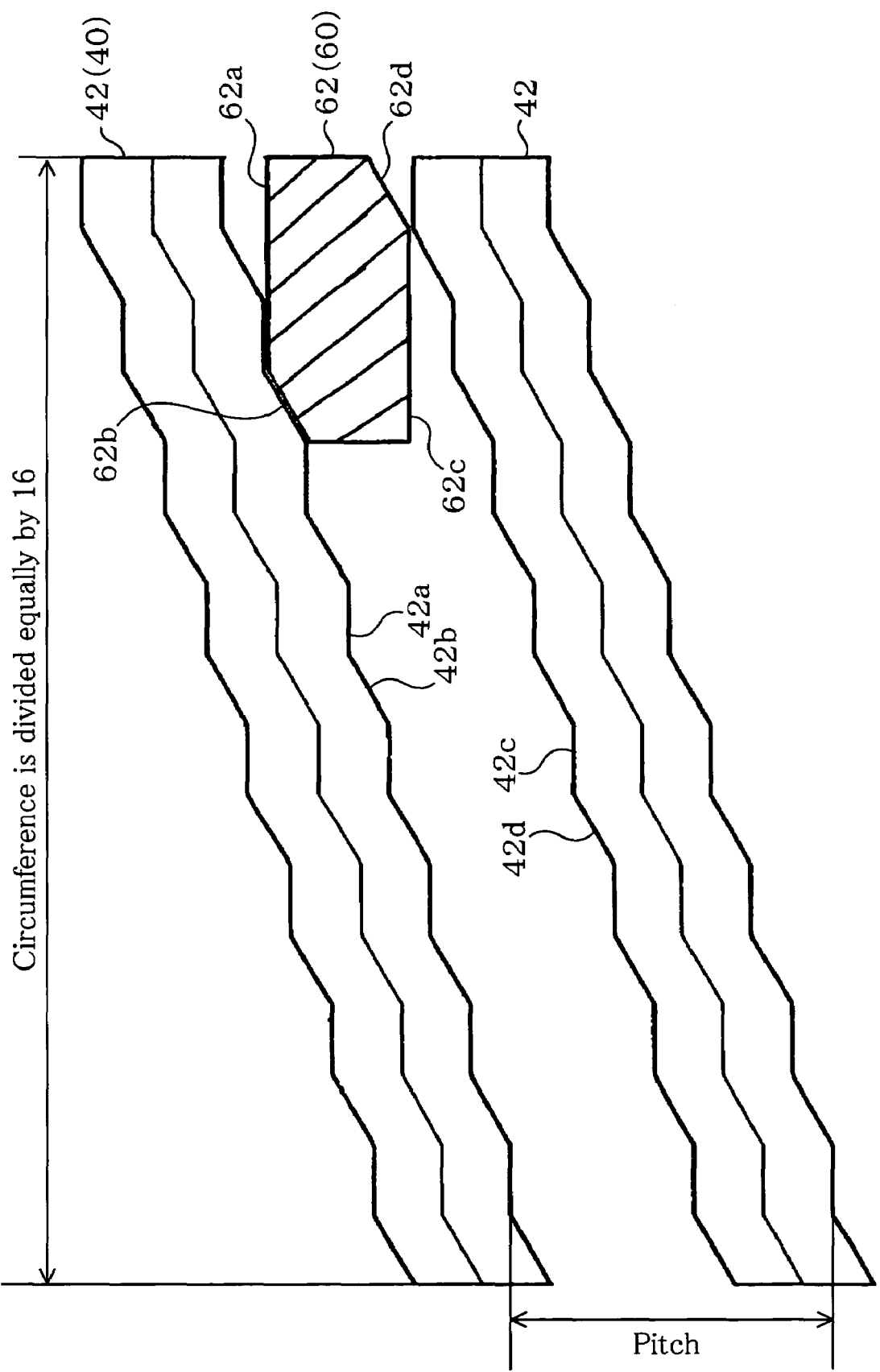
FIG. 11 is a development diagram showing a development condition of a fastening between the thread of the multi-pitch feed screw and the thread protrusion of the fourth multi-pitch nut.

FIG. 11 is a development diagram showing the development condition of a fastening between the thread 42 of the multi-pitch feed screw 40 and the thread protrusion 62 of the fourth multi-pitch nut 60. The pitch of the thread 42 of the multi-pitch feed screw 40 is 16 mm. Because the flank of the thread 42 is trapezoidal, a single turn is carried on along the effective diameter. On the advancement side flank of the thread 42, the flat portion 42a and the slope portion 42b are continuous alternately. Likewise, on the follow-up side flank, the flat portion 42c and the slope portion 42d are continuous alternately. With the flat portions 62a, 62c and the slope portions 62b, 62d of the thread 62 kept in a facial contact such that the flat portions 42a, 42c and the slope portions 42b, 42d of the thread 42 is kept in a sliding contact, the thread protrusion 62 is guided.

Figure 12:
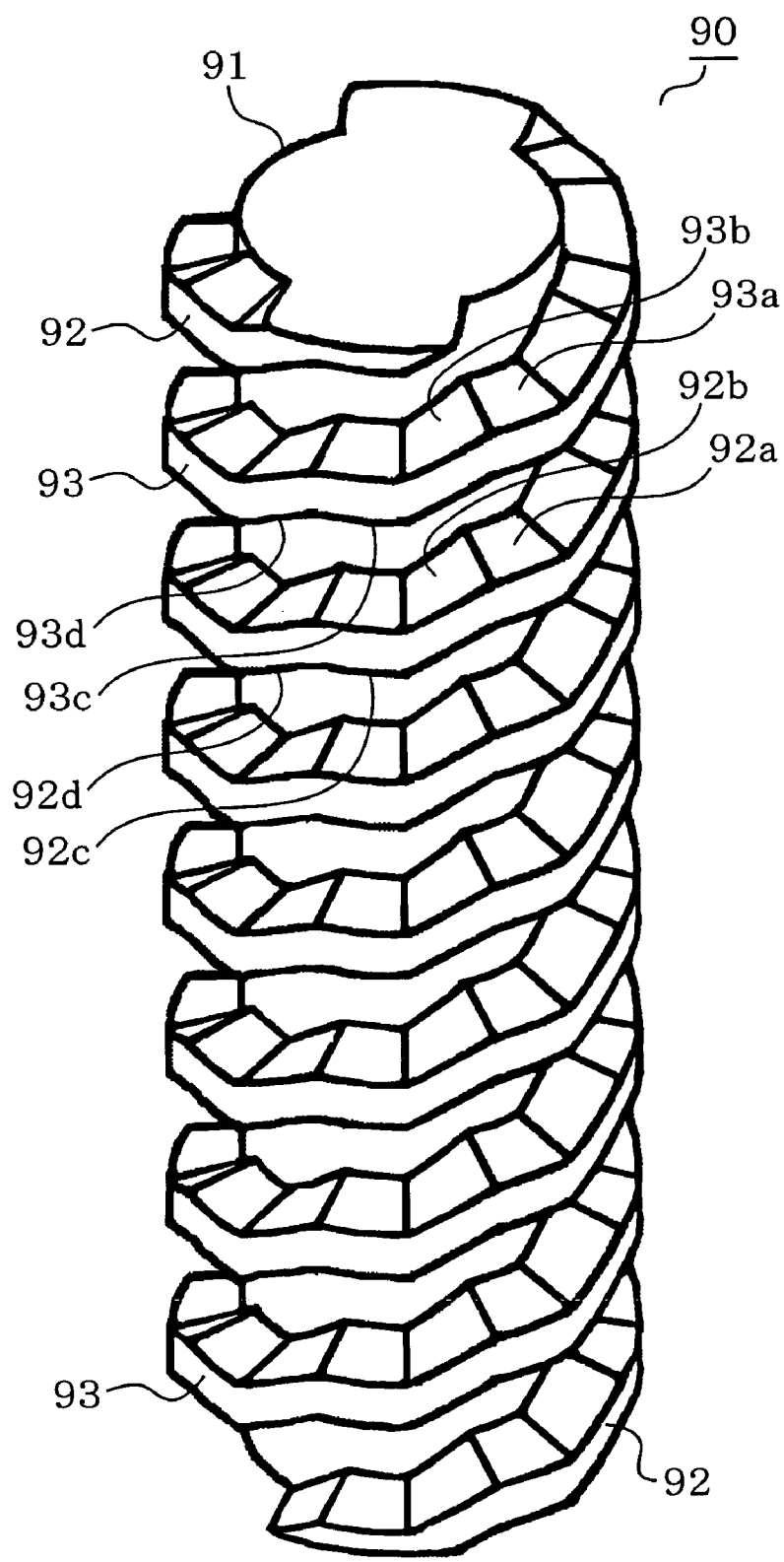
FIG. 12 is a perspective view showing a double-threaded multi-pitch screw.

FIG. 12 is a perspective view showing a double threaded multi-pitch screw 90. The multi-pitch double threaded screw 90 comprises a shaft portion 91, a first thread 92 formed spirally around the shaft portion 91 and a second thread 93. The first thread 92 is different from the second thread 93 by 180° in phase. On the advancement side flank of the first thread 92, a flat portion 92a and a slope portion 92b are continuous alternately and on the delay side flank, a flat portion 92c and a slope portion 92d are continuous alternately. On the advancement side flank of the second thread 93, a flat portion 93a and a slope portion 93b are continuous alternately and on the delay side flank, a flat portion 93c and a slope portion 93d are continuous alternately. The flat portions 92a, 92c and the slope portions 92b, 92d of the first thread 92 are formed so as to be located at the same angle position as the flat portions 93a, 93c and the slope portions 93b, 93d of the second thread 93.

Figure 13:
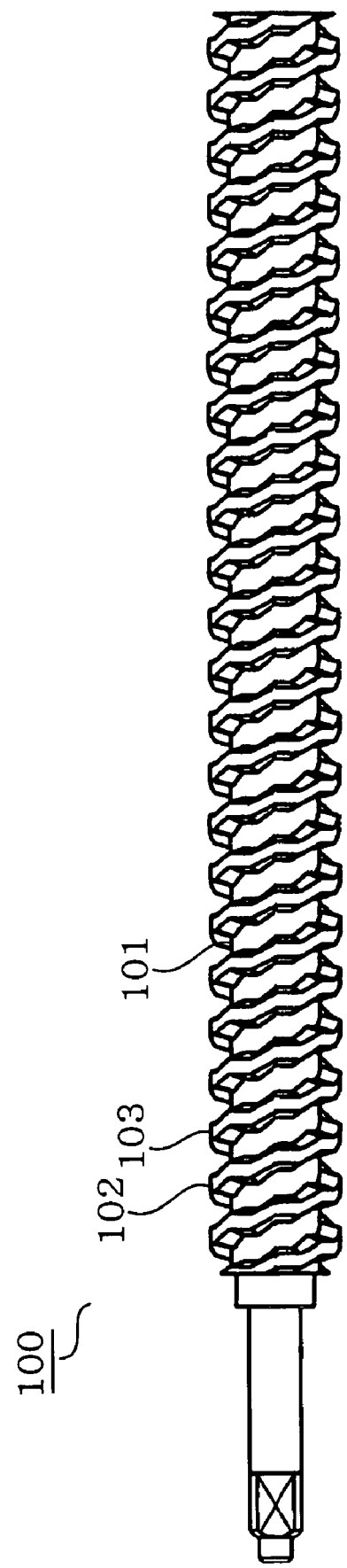
FIG. 13 is a front view showing the multi-pitch double-threaded screw obtained by applying the multi-pitch double threaded screw to a feed screw.

FIG. 13 is a front view showing the multi-pitch double-threaded screw 100 obtained by applying the multi-pitch double threaded screw to a feed screw. This multi-pitch double thread feed screw 100 is used for automobile power sheet. This multi-pitch double threaded feed screw 100 is a multi-pitch double threaded screw having two threads 102, 103. The lead of each thread 102, 103 is 16 mm, the pitch is 8 mm and the stroke is about 200 mm. The outside diameter of the multi-pitch double threaded feed screw 100 (outside diameter of the threads 102, 103) is φ20 mm, the effective diameter is φ18 mm and the diameter of the shaft portion 101 is 100 13.7 mm.

Figure 14:
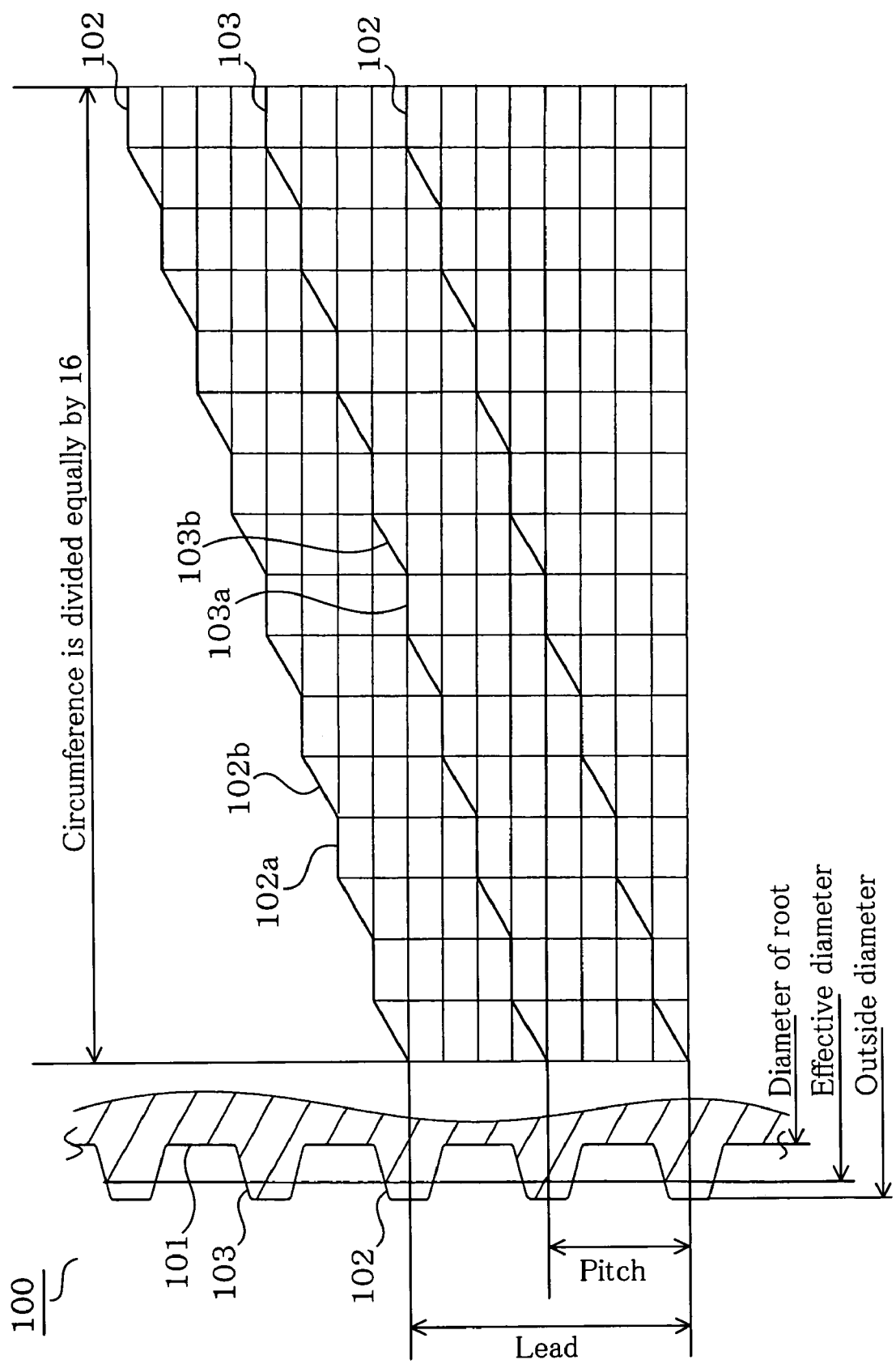
FIG. 14 is a development diagram showing the development of the thread shape and lead of the double threaded screw of the multi-pitch double threaded screw over 360°.

FIG. 14 is a development diagram showing the development of the thread shape and lead of the double threaded screw 102, 103 of the multi-pitch double threaded screw 100 over 360°. The multi-pitch double threaded feed screw 100 is a trapezoidal screw and the diameter of the root is φ13.7 mm, the effective diameter is φ18.0 mm and the outside diameter is φ20.0 mm. The lead of the double threads 102, 103 is 16 mm and the pitch of the threads 102, 103 is 8 mm. Those two threads are deflected by 180° in phase. The circumference of the first thread 102 is divided equally by 16 and the first thread is so constructed that a flat section 102a (hereinafter referred to as flat portion 102a) whose lead angle is zero and a section 102b (hereinafter referred to as slope portion 102b) inclined at a steep angle near 30° are formed alternately. Likewise, the circumference of the second thread 103 is divided equally by 16 and the first thread 103 is so constructed that a section 103a (hereinafter referred to as flat portion 103a) whose lead angle is zero and a section 103b (hereinafter referred to as slope portion 103b) inclines at a steep angle near 30° are formed alternately. Then, the flat portion 102a and the slope portion 102b of the first thread are formed at the same angle position as the flat portion 103a and the slope portion 103b of the second thread. The respective threads 102, 103 pass a single lead through eight steps.

Figure 15:
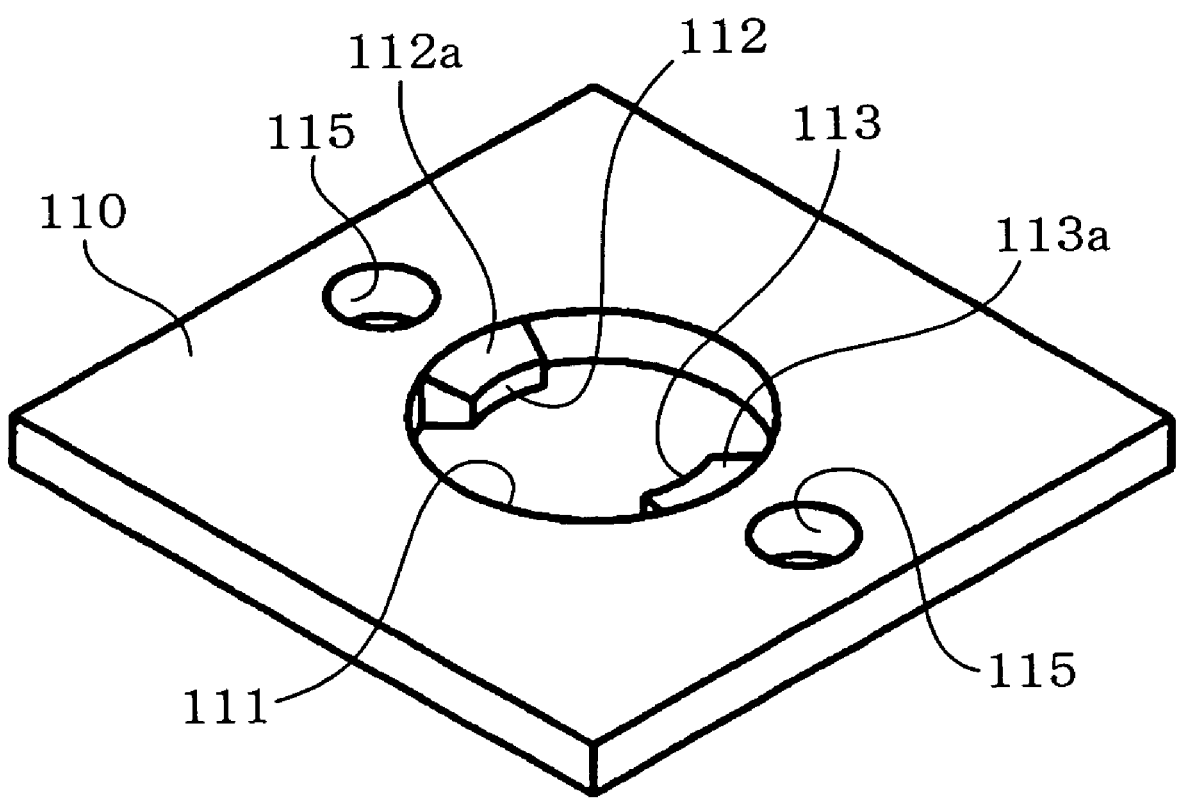
FIG. 15 is a perspective view showing the element sheet material of the multi-pitch double threaded nut which is to be fastened with the multi-pitch double threaded feed screw.

FIG. 15 is a perspective view showing the element sheet material 110 of the multi-pitch double threaded nut which is to be fastened with the multi-pitch double threaded screw 100. The multi-pitch double threaded nut element sheet material 110 is obtained by drilling a hole corresponding to a screw hole 111 in the center of a square sheet material having a predetermined thickness and two thread protrusions 112, 113 are formed at two positions opposing each other across 180° on the periphery of that screw hole 111. The two thread protrusions 112, 113 have a length corresponding to 2/16 a turn and flat portions 112a, 113a are formed on each trapezoidal flank. Two holes 115 are formed in the side portion of the multi-pitch double-threaded nut element sheet material 110. Such a multi-pitch double threaded nut element sheet material 110 can be manufactured easily at a high precision by pressing a sheet material. By combining such a multi-pitch double threaded nut element sheet material 110 with the spacer 67 shown in FIG. 10, plural pieces thereof may be stacked into a multi-pitch double threaded nut or the multi-pitch double threaded nut element sheet material 110 may be employed singularly as a multi-pitch double threaded nut. The two holes 115 are used as positioning pin holes for the stacking or as through holes for tightening bolts.

Figure 16:
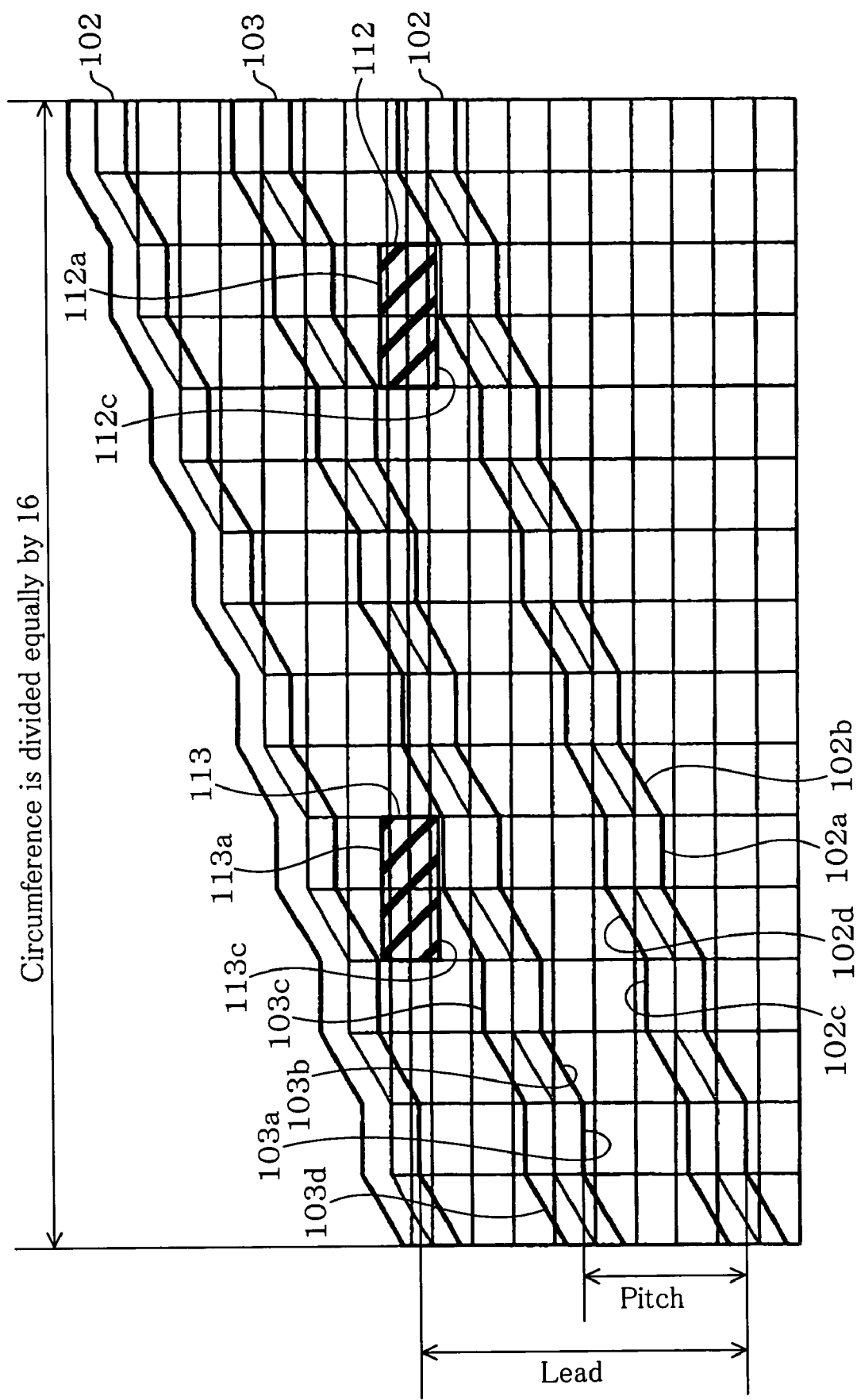
FIG. 16 is a development diagram showing a development condition of a fastening between the multi-pitch double-threaded nut composed of the multi-pitch double-threaded nut element sheet material and the multi-pitch double threaded screw.

FIG. 16 is a development diagram showing a development condition of a fastening between the multi-pitch double-threaded nut composed of the multi-pitch double-threaded nut element sheet material 110 and the multi-pitch double threaded screw 100. In the multi-pitch double threaded feed screw 100, the pitch of each of the threads 102, 103 is 8 mm and the lead is 16 mm. Because the flanks of the respective threads 102, 103 are trapezoidal, a single turn is attained through the effective diameter. Because double threads are provided, a first thread 102 and a second thread 103 appear alternately in the direction of a height in the Figure. On the advancement side flank of the first thread 102, the flat portion 102a and the slope portion 102b are continuous alternately and on the follow-up flank, the flat portion 102c and the slope portion 102d are continuous alternately. Likewise, on the advancement side of the second thread 103, the flat portion 103a and the slope portion 103b are continuous alternately and on the follow-up type flank, the flat portion 103c and the slope portion 103d are continuous alternately.

In the multi-pitch double threaded nut element sheet material 110, the two thread protrusions 112, 113 are disposed at positions deflected by 180° in phase on the same height in the Figure. The two thread protrusions 112, 113 are a rectangle whose length corresponds to 2/16 turn. The first thread protrusion 112 is guided with a flat portion 112a on the advancement side kept in a facial contact with a flat portion 103a on the advancement side of the second thread 103 and a flat portion 112c on the follow-up side kept in a facial contact with a flat portion 102c on the follow-up side of the first thread 102. The slope portions 102d, 103b are guided with the ridges on edges of the flat portions 112a, 112c of the first thread protrusion 112 kept in linear contact with the slope portions 102d, 103b. Likewise, the second thread protrusion 113 is guided with the flat portion 113a on the advancement side kept in facial contact with the flat portion 102a on the advancement side of the first thread 102 and the flat portion 113c on the follow-up side kept in a facial contact with the flat portion 103c of the second thread 103. The slope portions 102b, 103d are guided with the ridges on edges of the flat portions 113a, 113c of the second thread protrusion 113 kept in a liner contact with the slope portions 102b, 103d.

Thus, this embodiment has such an advantage that the multi-pitch double threaded nut element sheet material 110 is guided without any play. Further, because the two thread protrusions 112, 113 located at symmetrical positions deflected by 180° on the same height receive a force from the multi-pitch double threaded feed screw 100, there is another advantage that an excellent balance is ensured.

Figure 17:
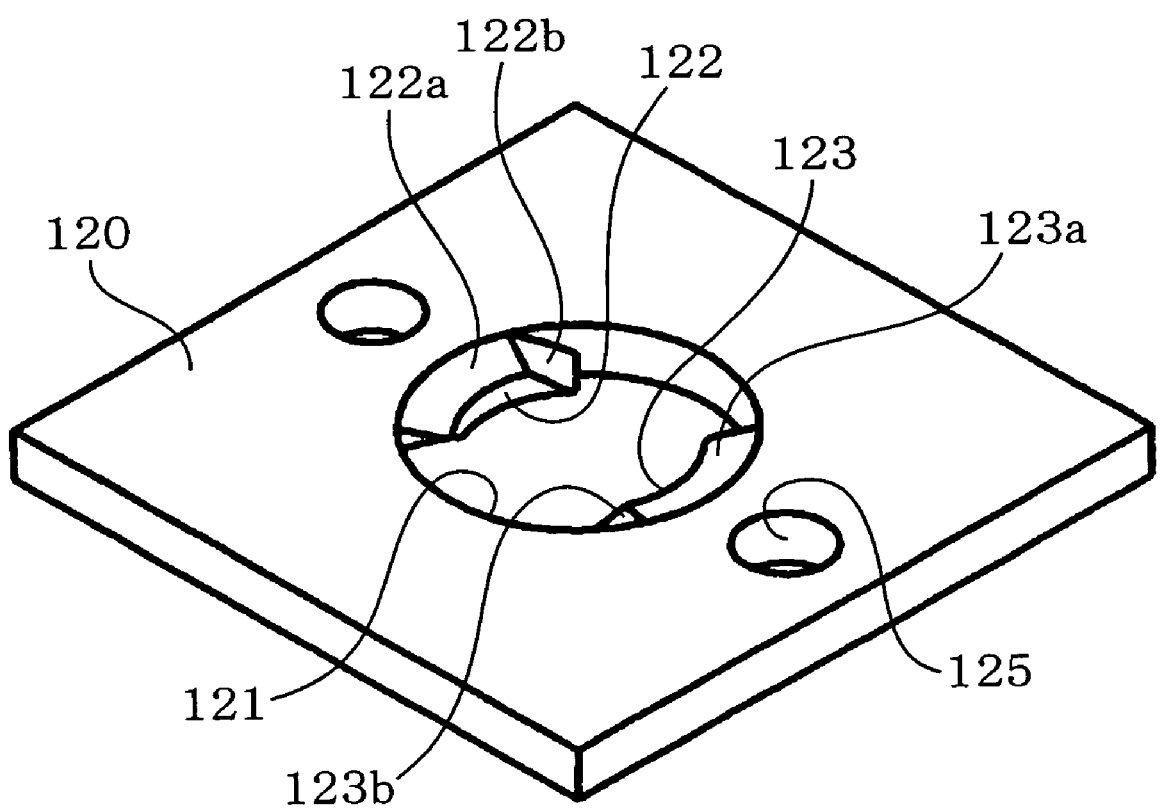
FIG. 17 is a perspective view showing the element sheet material of the second multi-pitch double threaded nut.

FIG. 17 is a perspective view showing the second multi-pitch double threaded nut element sheet material 120. In the second multi-pitch double threaded nut element sheet material 120, a hole corresponding to a screw hole 121 is made in the center of a square sheet material having a predetermined thickness and two thread protrusions 122, 123 are formed at positions opposing each other by 180° on the periphery of that screw hole 121. The two thread protrusions 122, 123 have a length corresponding to 4/16 turn and flat portions 122a, 123a and slope portions 122b, 123b are formed on a trapezoidal flank. Flat portions 122c, 123c and slope portions 122d, 123d are formed on a back side also although not seen on this perspective view. Two holes 125 are formed in the side portions of the second multi-pitch double threaded nut element sheet material 120. Such a second multi-pitch double threaded nut element sheet material 120 can be manufactured easily at a high precision by pressing a sheet material. By combining this multi-pitch double threaded nut element sheet material 120 with the spacer 67 shown in FIG. 10, plural pieces thereof may be stacked so as to produce a multi-pitch double threaded nut. Alternatively, the multi-pitch double threaded nut element sheet material 120 may be employed singularly as a multi-pitch double threaded nut. The two holes 125 may be used as holes for positioning pins for the stacking or as through holes for tightening bolts.

Figure 18:
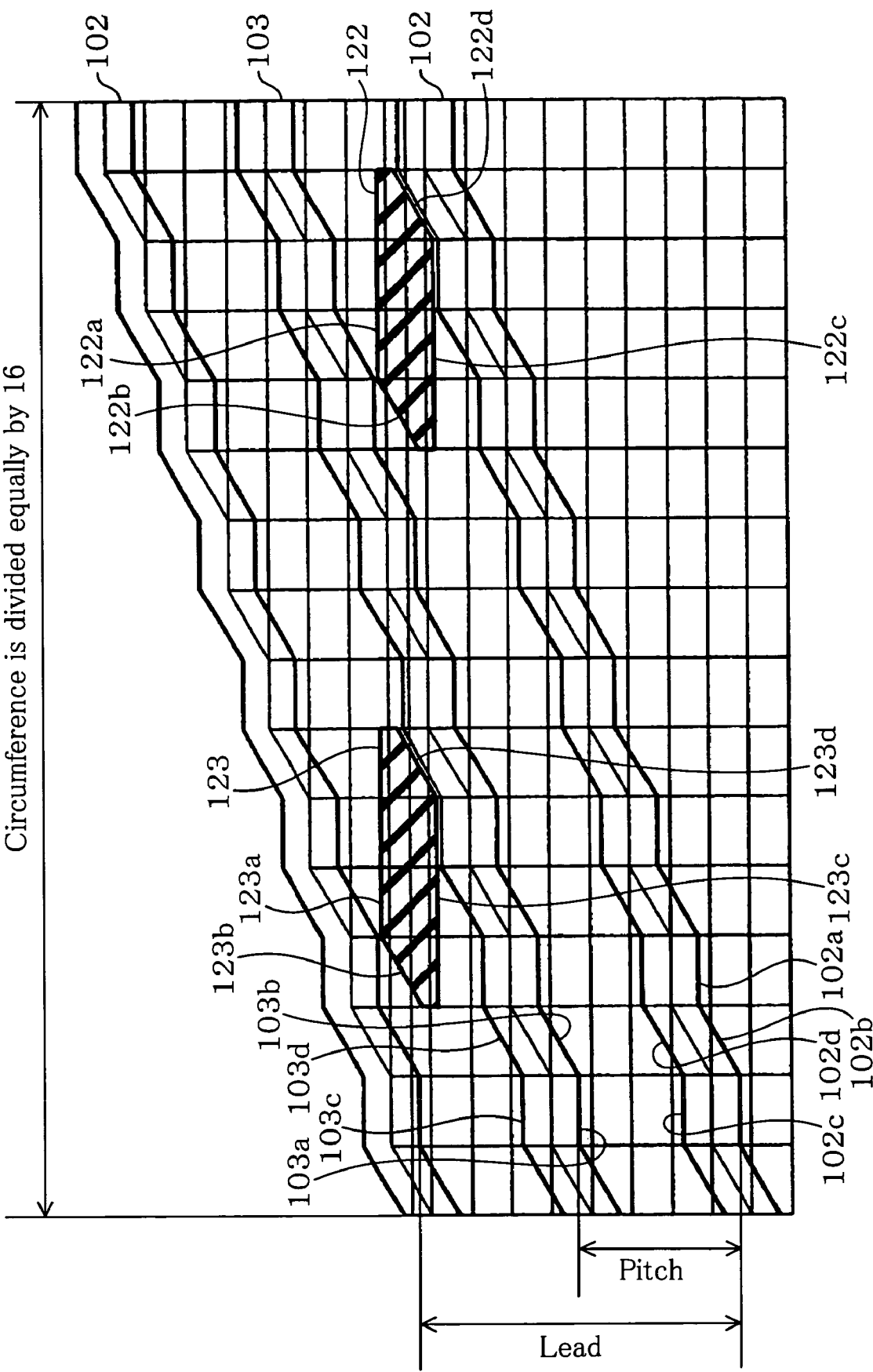
FIG. 18 is a development diagram showing the development of fastening condition between the multi-pitch double threaded nut composed of the second multi-pitch double threaded nut element sheet material and the multi-pitch double threaded screw.
Figure 19:
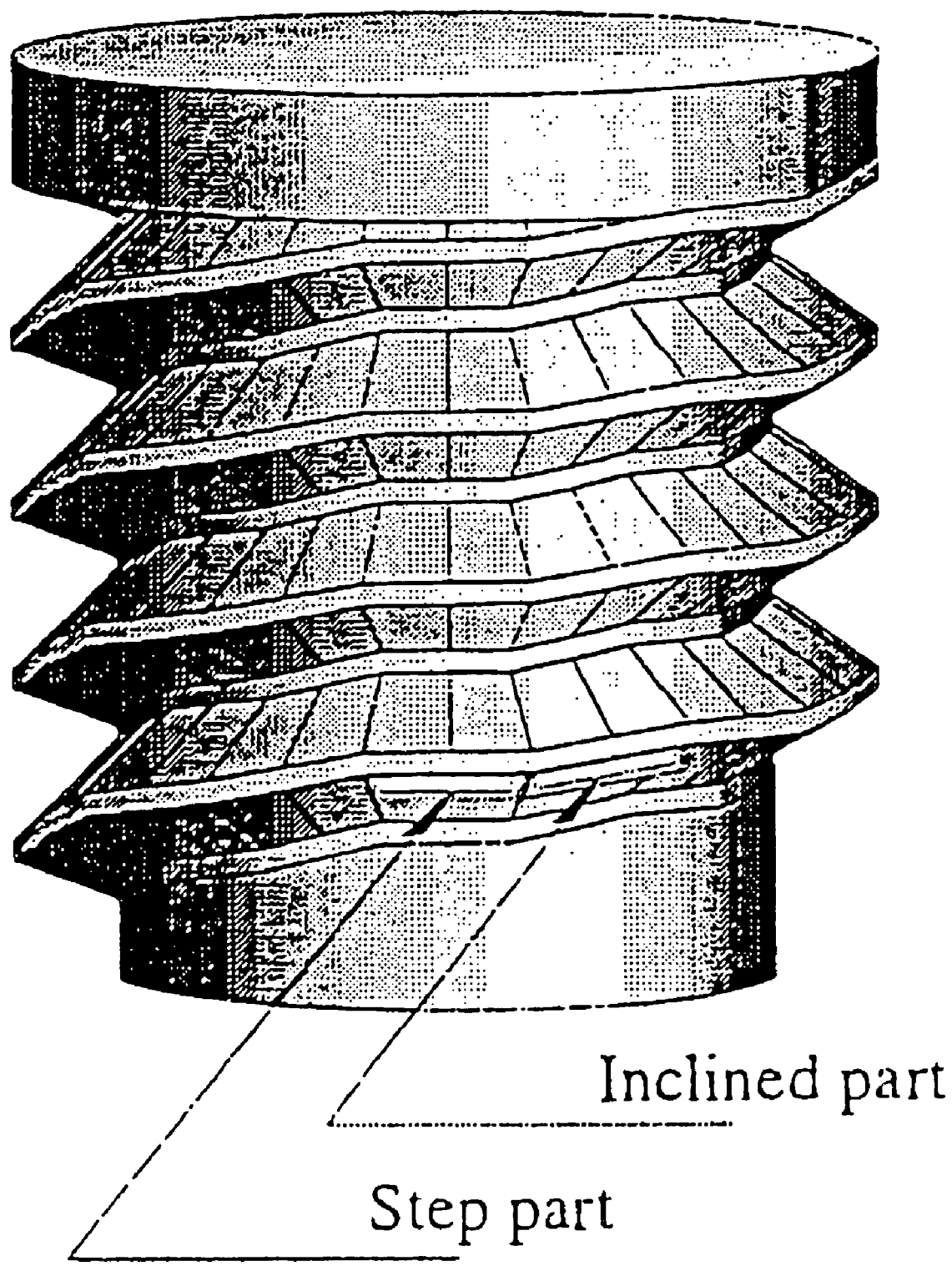
FIG. 19 is a front view showing a step lock bolt which is a conventional technology.

FIG. 18 is a development diagram showing the development of fastening condition between the multi-pitch double threaded nut composed of the second multi-pitch double threaded nut element sheet material 120 and the multi-pitch double threaded screw 100. Because the multi-pitch double threaded feed screw 100 is the same as described about FIG. 16, like reference numerals are attached and description thereof is omitted. Two thread protrusions 122, 123 of the second multi-pitch double threaded nut element sheet material 120 are disposed at positions deflected by 180° in phase on the same height. The two thread protrusions 122, 123 are substantially parallelogram having a length corresponding to 4/16 turn. The first thread protrusion 122 is guided with a flat portion 122a on the advancement side kept in facial contact with a flat portion 103a on the advancement side of the second thread 103 and a flat portion 122c on the follow-up side kept in facial contact with a flat portion 102c on the follow-up side of the first thread 102. Further, a slope portion 122b delayed in phase of a first thread protrusion 122 is guided to a slope portion 103b of a second thread 103 and a slope portion 122d advanced in phase of the first thread protrusion 122 is guided to a slope portion 102d of the first thread 102, so that the slope portions are guided under the facial contact also.

Likewise, the second thread protrusion 123 is guided with a flat portion 123a on the advancement side kept in a facial contact with a flat portion 102a on the advancement side of the first thread 102 and a flat portion 123c on the follow-up side kept in a facial contact with a flat portion 103c on the follow-up side of the thread 103. Further, a slope portion 123b delayed in phase of the second thread protrusion 123 is guided to a slope portion 102b of the first thread 102 and a slope portion 123d advanced in phase of the second thread protrusion 123 is guided to a slope portion 103d of the second thread 103, so that the slope portions are guided under the facial contact.

Thus, this embodiment provides advantages that the second multi-pitch double threaded nut element sheet material 120 is guided without any play and that because the two thread protrusions 122, 123 located at positions symmetrical deflected by 180° on the same height receive a force from the multi-pitch double threaded feed screw 100, an excellent balance is ensured. And there is an additional advantage that because the thread protrusions 122, 123 of the second multi-pitch double threaded nut element sheet material 120 are guided to the threads 102, 103 of the multi-pitch double threaded feed screw 100 through the facial contact, it has an excellent mechanical strength and is highly resistant to friction.

Although in the above-described respective embodiments, the interval of the flat portion has been explained as a flat portion whose lead angle is zero, it is apparent that the same operation and effect are exerted if the lead angle of this interval is not set to zero but described as an interval having a milder gradient than the self-lock angle. Further, although this has been described as a feed screw device, it is apparent that a step-like strong loosening preventing operation is exerted when it is employed as a tightening device.

As described above, the present invention has such an effect that it provides a screw and a nut capable of preventing them from loosening by step securely without applying any excessive stress on the members although it is only locked discontinuously. Further, a comfortable and quick feeding can be achieved without applying any load to a motor or gear box and further, there is such an excellent effect that it provides a feed screw device whose self-lock function is activated by step even when a torque from a driving source is interrupted, although not continuously.

The invention claimed is:

1. A combination of a multi-pitch screw and a multi-pitch nut, said multi-pitch screw comprising a thread of a male screw having both sides of the thread formed such that sections having a mild lead angle and sections having a steep lead angle are arranged alternately, continuously and stepwisely during a single turn along a spiral line, said multi-pitch nut comprising a thread of a female screw having both sides of the thread formed such that a section in which a lead angle is mild and a section in which a lead angle is steep are arranged alternately, continuously and stepwisely during a single turn along the spiral line.

2. The combination of the multi-pitch screw and the multi-pitch nut according to claim 1, wherein the lead angles of said sections having a mild lead angle of the male screw are zero degrees with respect to a normal plane of said screw's axis, which forms flat steps of the thread.

3. The combination of the multi-pitch screw and the multi-pitch nut according to claim 1, wherein the lead angle of said sections having the mild lead angle of the male screw is flatter than the lead angle of said sections having the steep lead angle of the male screw, thus forming flat sections of the thread, which stepwisely lock and unlock screw movements by engaging and disengaging direct contacts of the flat sections.

4. The combination of the multi-pitch screw and the multi-pitch nut according to claim 1, wherein the lead angles of the sections of said female screw having mild lead angle are zero degrees with respect to a normal plane of said screw's axis, which forms a flat steps of the thread.

5. The combination of the multi-pitch screw and the multi-pitch nut according to claim 1, wherein the lead angle of said sections having the mild lead angle of said female screw is flatter than the lead angle of said sections having the steeper lead angle of the female screw, thus forming flat sections of the thread, which stepwisely lock and unlock screw movements by engaging and disengaging direct contacts of the flat sections.

6. A feed screw device comprising said combination of the multi-pitch screw and the multi-pitch nut described claim 1.

7. A screw fastener mechanism comprising said multi-pitch screw and said multi-pitch nut of claim 1.

* * * * *